Figure 1:
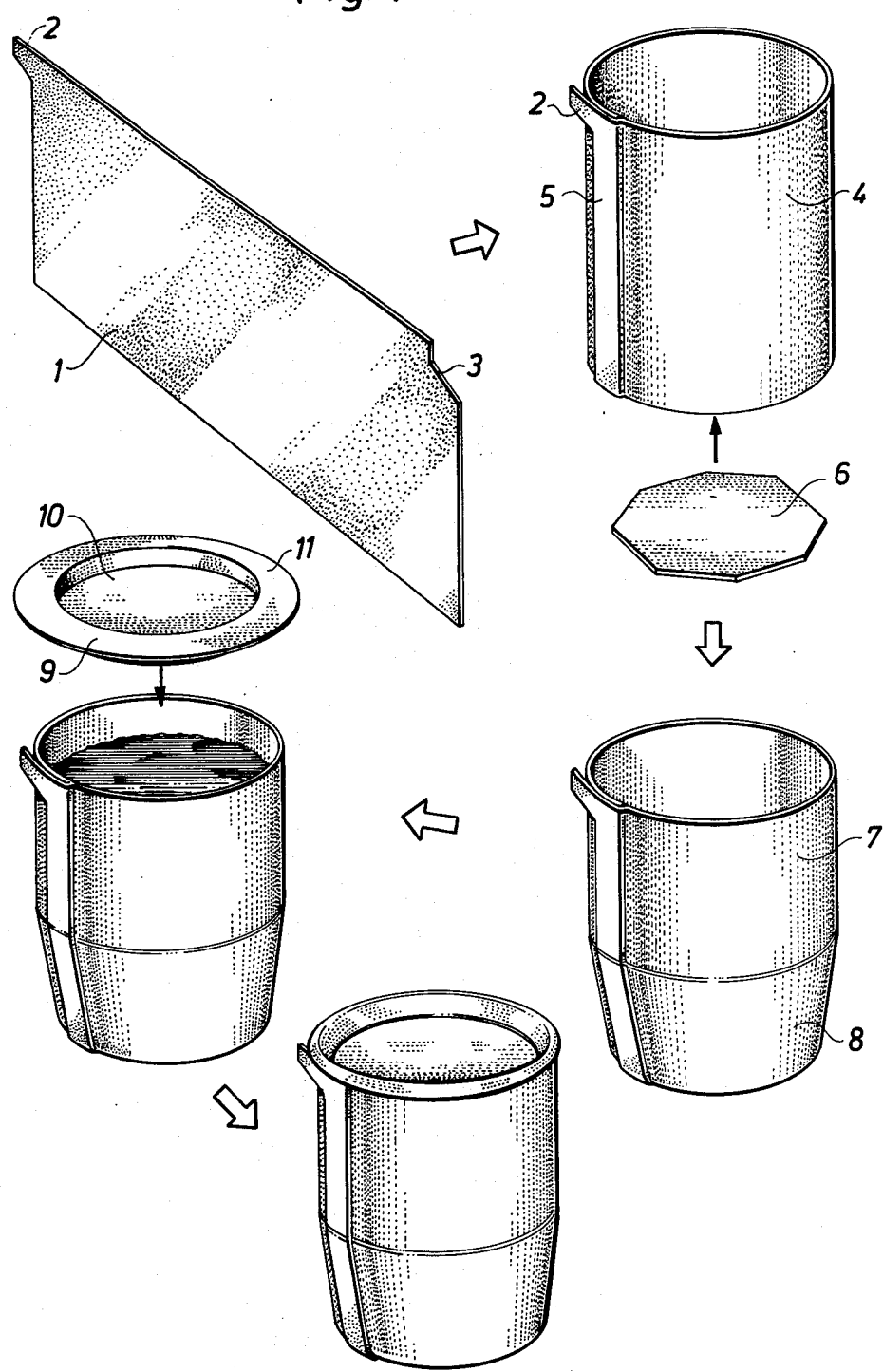

United States Patent [19]

Pupp et al.

[11] 4,077,829

[45] Mar. 7, 1978

[54] MACHINE FOR THE MANUFACTURE OF PACKING CONTAINERS

[75] Inventors: Herwig Pupp; Birger Otto Andersson, both of Lund, Sweden

[73] Assignee: AB Ziristor, Lund, Sweden

[21] Appl. No.: 720,516

[22] Filed: Sep. 3, 1976

[30] Foreign Application Priority Data

Sep. 10, 1975 Sweden .............................. 7510092

[51] Int. Cl.² ............................................ B29D 23/00
[52] U.S. Cl. .................................. 156/446; 53/30 S; 156/85; 156/86; 156/217; 156/218; 156/499
[58] Field of Search ............... 156/184, 187, 189, 191, 156/212, 217, 218, 499, 443, 446, 447, 448, 449, 457, 466, 85, 86; 93/36.05, 36.1, 36.2, 36.8, 39 C, 39.1 R, 59 R, 59 ES, 59 MT, 81 R, 81 MT, 82; 53/30 S, 184, 192

[56] References Cited

U.S. PATENT DOCUMENTS

| | | | |
|---|---|---|---|
| 3,967,991 | 7/1976 | Shimano et al. | 156/218 |
| 3,969,173 | 7/1976 | Amberg et al. | 156/86 |
| 3,970,492 | 7/1976 | Amberg et al. | 156/446 |

*Primary Examiner*—Caleb Weston
*Attorney, Agent, or Firm*—Burns, Doane, Swecker & Mathis

[57] ABSTRACT

A machine for transforming heat shrinkable thermoplastic material into sealed and liquid-filled containers in which the material in strip form is cut off to a suitable length then heated and transformed into a tube-shaped shell blank on a mandrel with an overlapped longitudinal heat-sealed seam. The shell is then displaced in relation to the mandrel so that its bottom end extends beyond the end of the mandrel, a base blank cut from another strip is then inserted into the end of the shell to rest against the mandrel end, and the shell and inserted base are then heated causing the shell to shrink accurately to the shape of the mandrel and the bottom edge zone of the heated shell to be folded in against the end of the mandrel and the edge of the base. The joined edge zones of the shell and base are then pressed together and heat sealed. The container is then passed to a filling machine where it is filled and closed by a lid.

11 Claims, 40 Drawing Figures

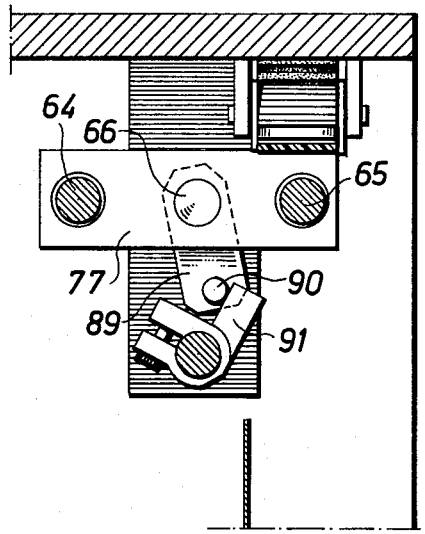
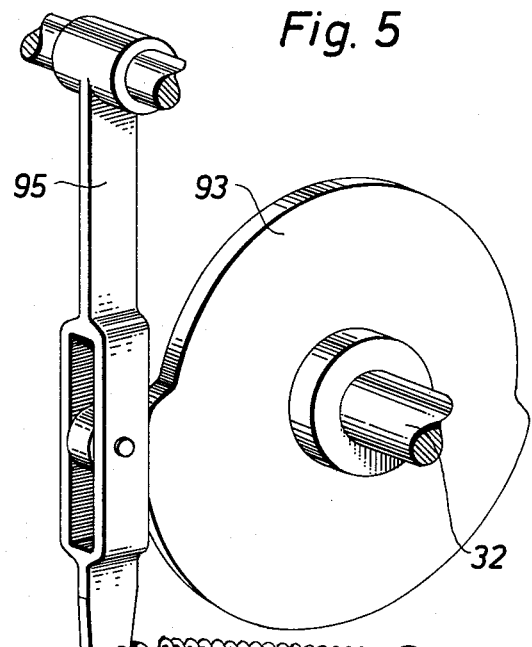
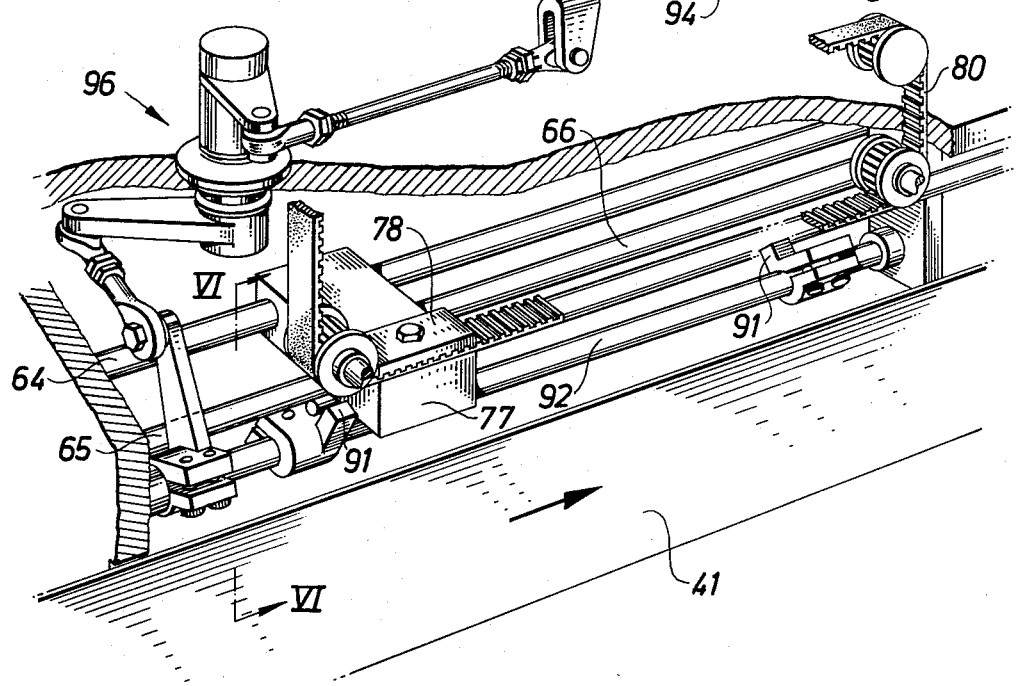
Fig. 6
Fig. 5

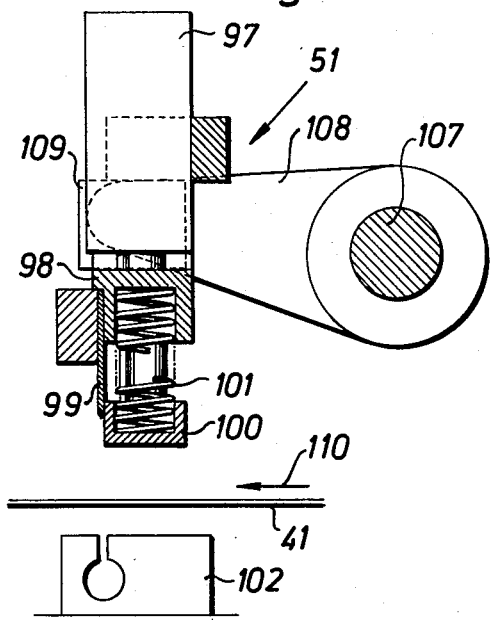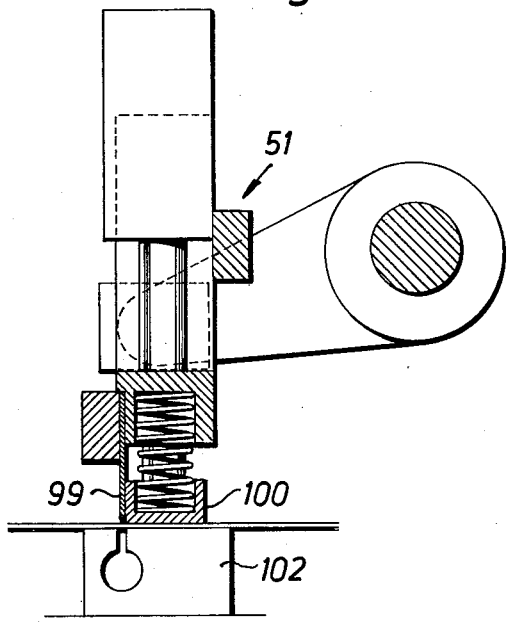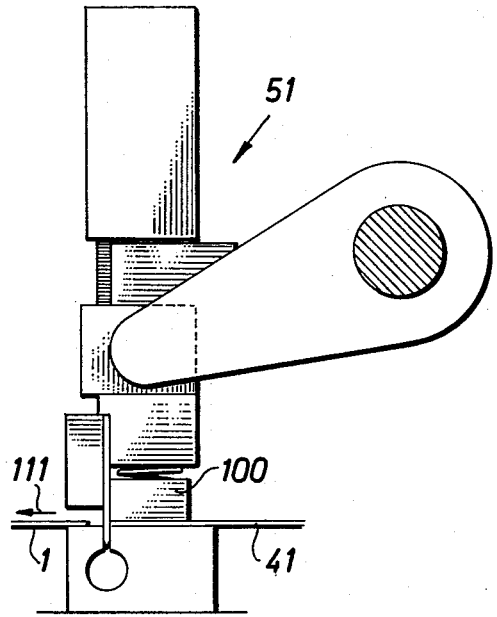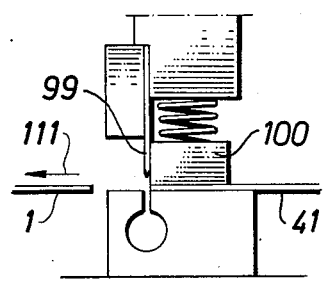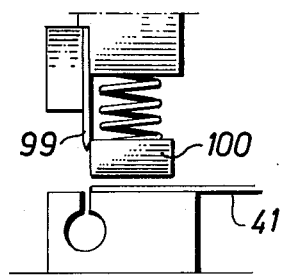

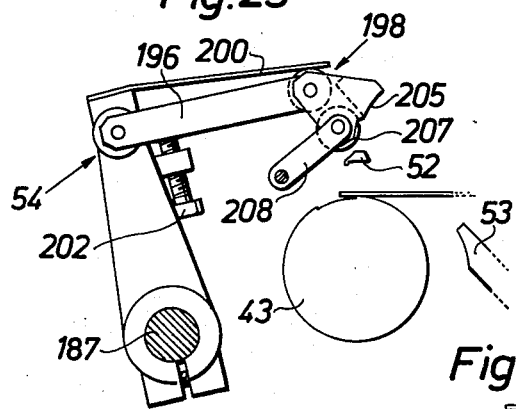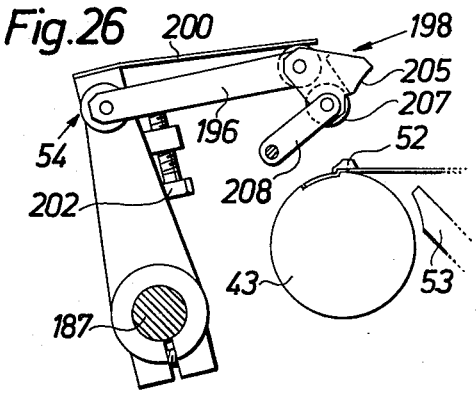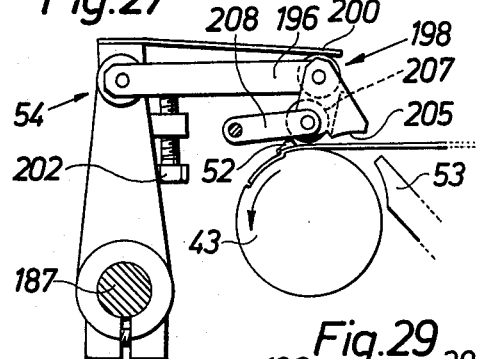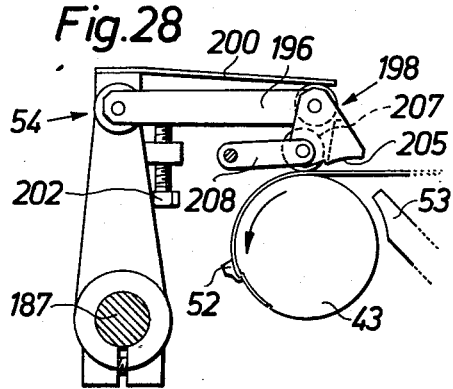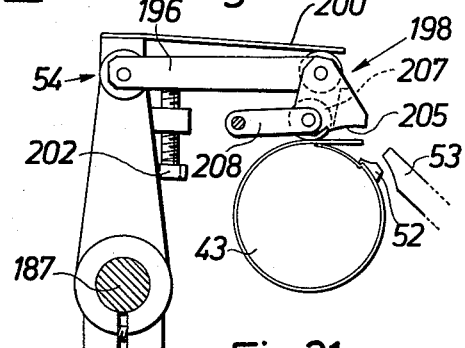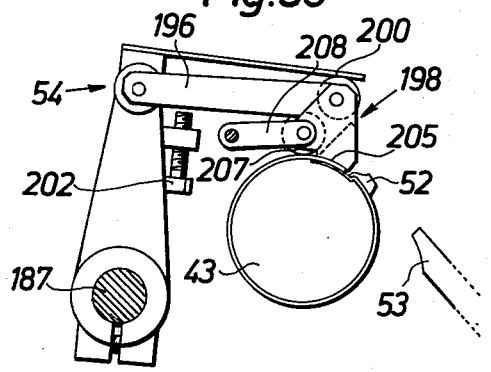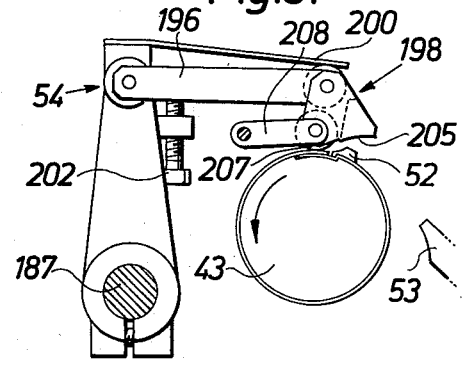

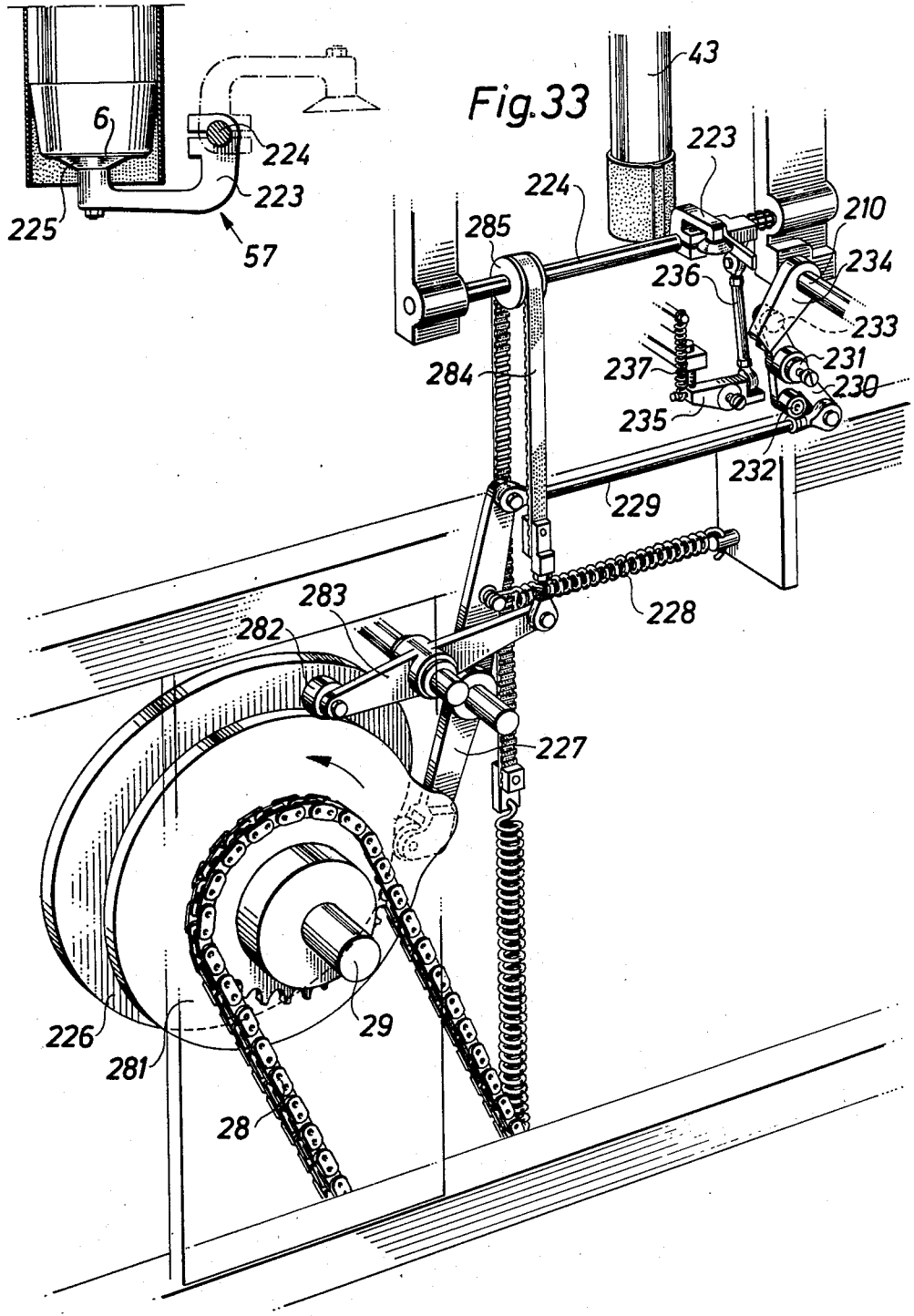

MACHINE FOR THE MANUFACTURE OF PACKING CONTAINERS

The present invention relates to a machine for the manufacture of packing containers from a thermoplastic material that shrinks under the influence of heat.

It is known that cup-shaped packing containers can be made from a laminated material which comprises a carrier layer of foamed plastics, which container has a substantially tubular portion and at least one end plate. Such a packing container is described in Swedish Pat. application No. 7413152-5 (Swedish Pat. No. 381.442) and is characterized in that the end plate comprises a material disc situated in the container part and near the end of the same, the edge zone of which disc is sealed to a zone of the tubular container part folded in by shrinkage to rest against the underside of the material disc.

The preferred material from which this packing container is made is a laminated material which comprises a carrier layer of foamed plastics with thinner layers of homogeneous plastics material applied on either side. The cells constituting the foamed plastics layer have been given a lenticular or elongated shape by a stretching carried out after the extrusion of the material. Since the cells are normally spherical and endeavour to assume once more this normal shape they will, when the finished material is again heated to softening, revert to the utmost possible extent to the spherical shape, which means that the material shrinks. Consequently the thermoforming of the material around e.g. a profiled mandrel can take place without the cellular structure being changed or excessive variations of thickness occurring. As an example of a suitable material may be mentioned a laminated material with a carrier layer of polystyrene foam plastics and layers of homogeneous polystyrene applied to both sides of the same. The foamed plastics layer has a thickness of 0,6 mm and the homogeneous polystyrene layers have a thickness of 0,1 mm.

In the preferred method for the manufacture of the said packing container, which is also described in the abovementioned Swedish patent application, use is made of the capacity of the material for controlled shrinkage under the influence of heat. The manufacturing process is initiated in that a rectangular strip of material is heated and transformed to a cylindrical shell part by being wound around a mandrel and by its ends being joined together to an overlap joint. Into one end of the shell part which extends somewhat beyond the end of the mandrel, a material disc is then introduced which is to form the base of the packing container. Subsequently the shell blank as well as the material disc are heated, as a result of which the shell blank will shrink and adhere closely to the mandrel. The end zone of the shell blank extending beyond the end of the mandrel will on shrinking be folded in over the edge zone of the material disc and by the pressing together of these two edge zones an impervious base seal of the overlap type is achieved.

The described packing container manufactured in this manner presents a number of advantages compared with the cup-shaped packaging container which is manufactured by heating and vacuum-forming of a material web. Since the material in the shell surface of the packing container is not stretched or bent during the manufacture it is possible e.g. to decorate the material already when it is in web form, which previously was not possible, since the vacuum-forming of the material leads to the decorating pattern or the text being disturbed. It is a further advantage that the packing container, owing to the foamed plastics layer included in the material, obtains insulating properties which make it especially suitable for e.g. hot beverages or ice. The method of manufacturing the packing container from a rectangular material blank means, moreover, that the material is optimally utilized and waste material is kept to a minimum.

It is an object of the present invention to provide a machine for the manufacture of cup-shaped packing containers.

It is a further object of the present invention to provide a machine for the manufacture of packing containers of the type which is described in the Swedish Pat. application No. 7413152-5.

These and other objects have been achieved in accordance with the invention in that a machine for the manufacture of cup-shaped packing containers from a thermoplastic material that shrinks under the influence of heat is given the characteristic that it comprises a first machine part with elements for the supply, division and forming of a web-shaped material to individual, sleeve-shaped shell blanks, and a second machine part with elements for the assembling of the shell blanks and substantially plane base blanks, and the sealing and forming of the blanks to impervious cup-shaped packing containers.

A preferred embodiment of the machine has in accordance with the invention been given the further characteristic that it comprises at least one mandrel to take up each individual sheel blank, which mandrel has a shape corresponding to the inner shape of the finished packing container, an element for the introduction of a base blank into the shell blank at the one edge zone of the same extending beyond the end of the mandrel, an element for the heating and shrinking of the edge zone so as to fit against the base blank as well as the mandrel and an element for the joining together of edge zones of the shell blank and the base blank to an impervious base joint.

Further preferred embodiments of the machine in accordance with the invention have been given the characteristics which will become evident from one or more of the following claims.

One embodiment of the machine in accordance with the invention will be described in detail in the following with reference to the enclosed, partly schematic drawings, on which the same details have been designated with the same reference number in all figures.

Figure 2:
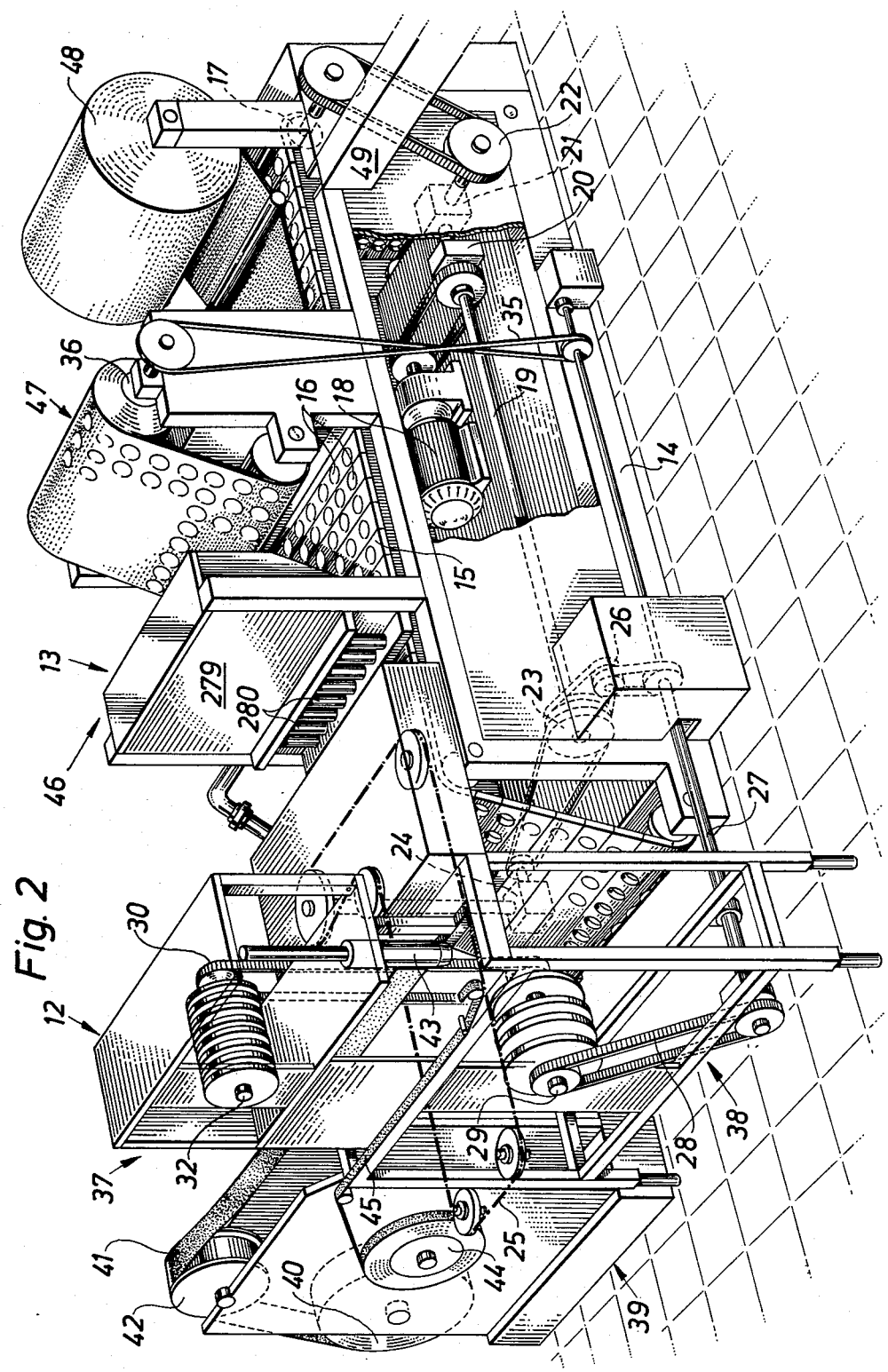
Figure 3:
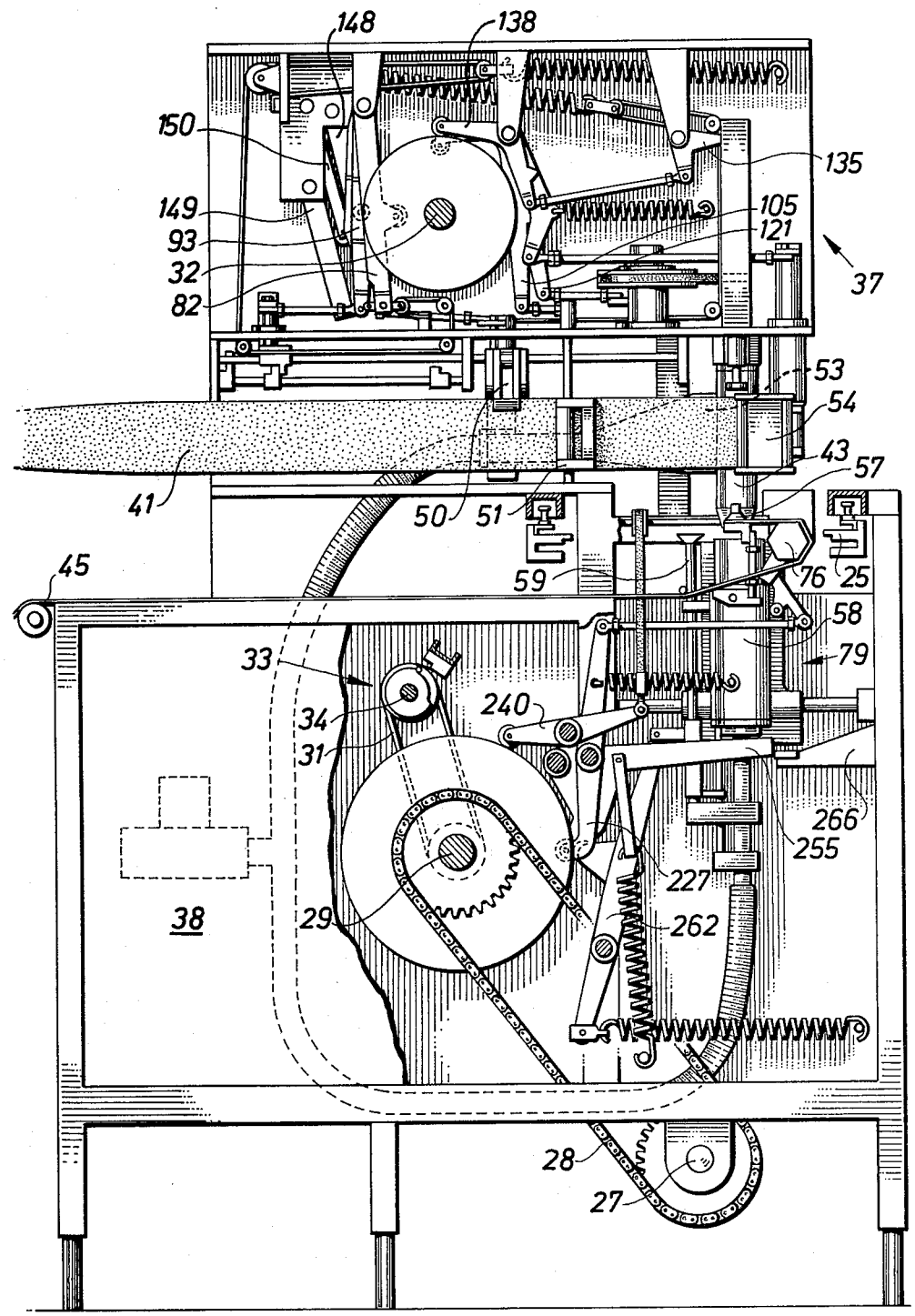
Figure 4:
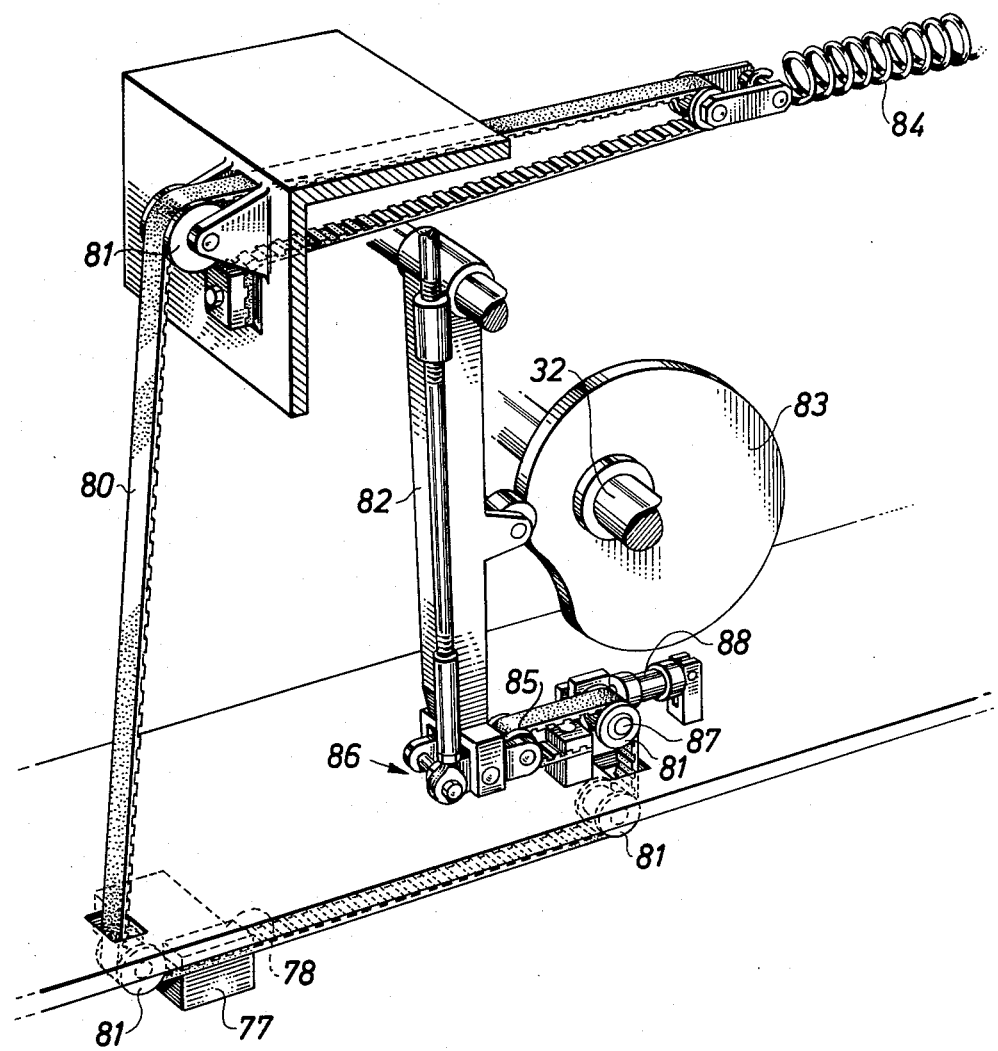
Figure 7:
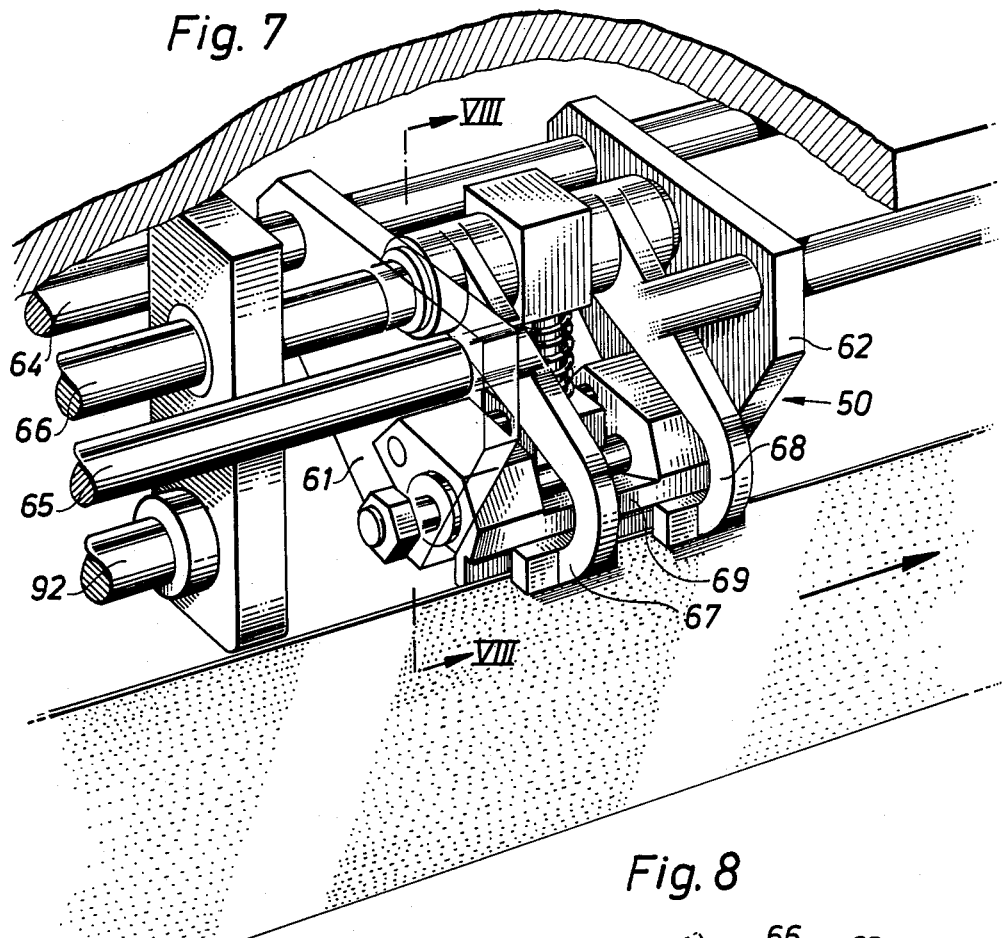
Figure 8:
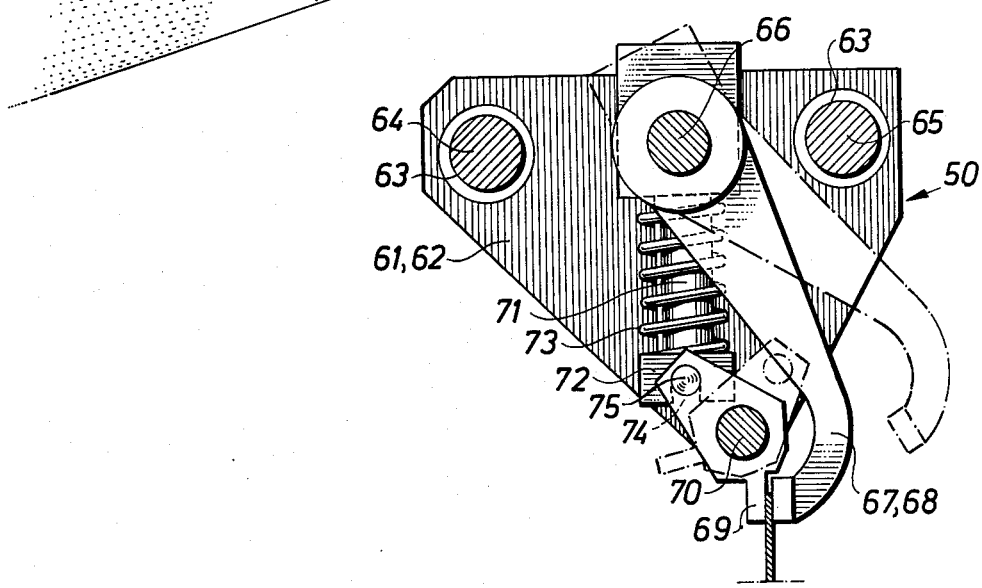

FIG. 1 shows in the form of a flow diagram the different phases during the manufacture of a packing container of the type in question, FIG. 2 shows schematically and in perspective view a machine in accordance with the invention combined with a filling machine, FIG. 3 is a side view of the machine in accordance with the invention which for the sake of clearness is shown partly in cross-section, FIGS. 4 to 8 show an arrangement included in the machine for the feed of web-shaped packing material, and more particularly FIG. 4 shows in perspective view an arrangement for imparting a reciprocating movement to a feed unit, FIG. 5 shows in perspective view an arrangement for the manoeuvering of material holding arms included in the feed unit, FIG. 6 a detail of movement transmission details included in the manoeuvering arrangement in accordance with FIG. 5, FIG. 7 the feed unit in perspective view and FIG. 8 the feed unit in section with the material holding arms in closed (fully drawn lines) and open (dash-dotted lines) position.

Figure 9:
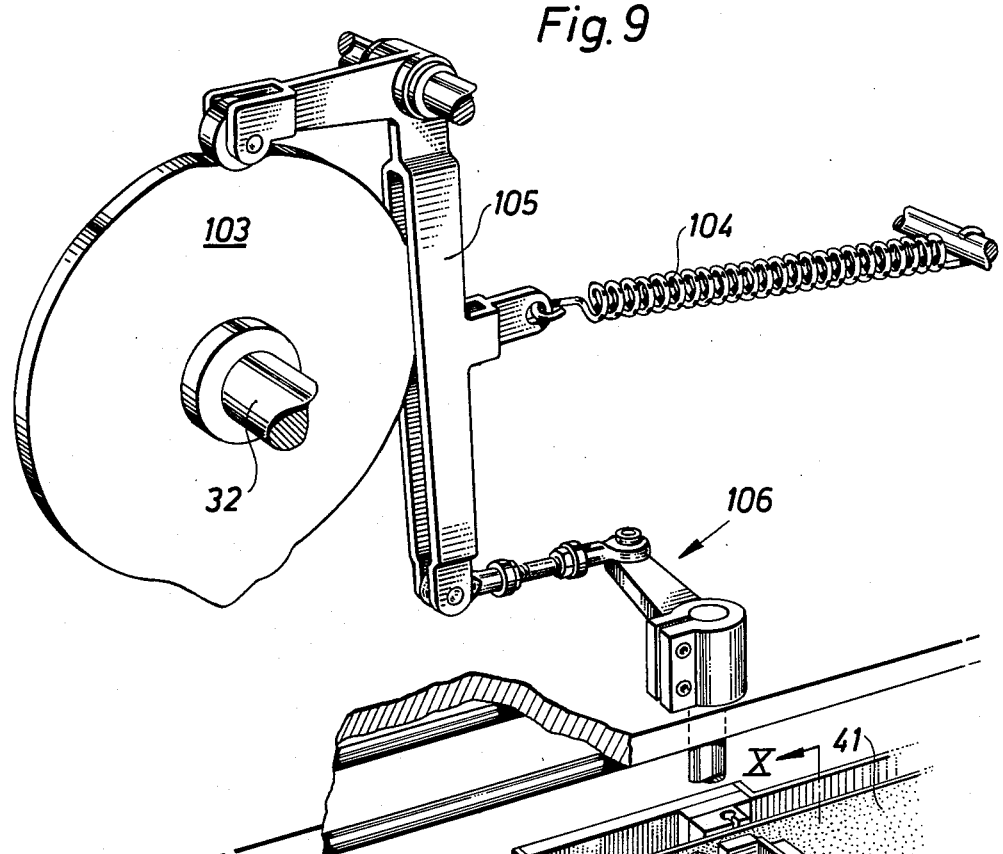
Figure 10:
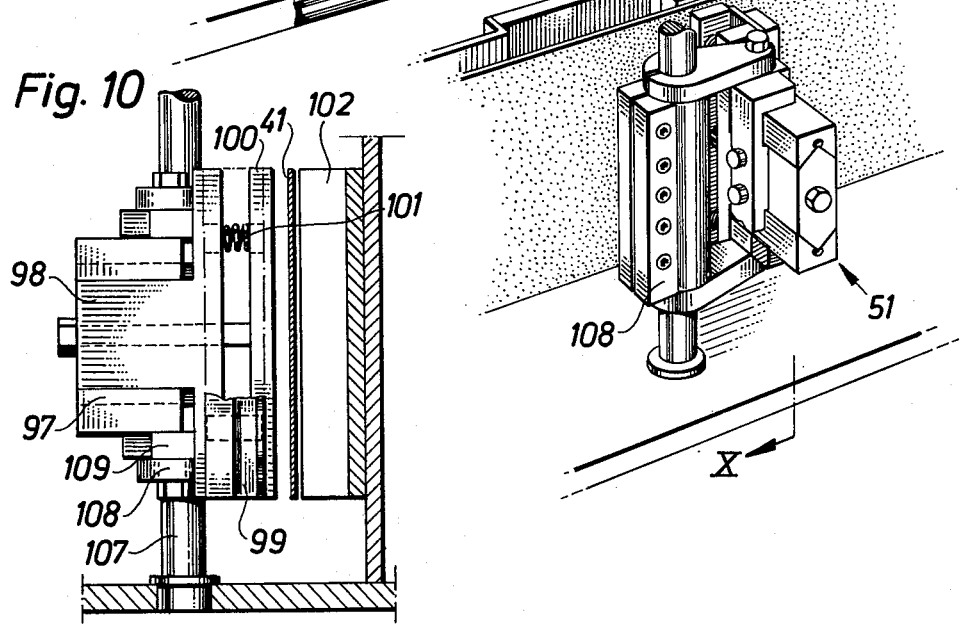
Figure 16:
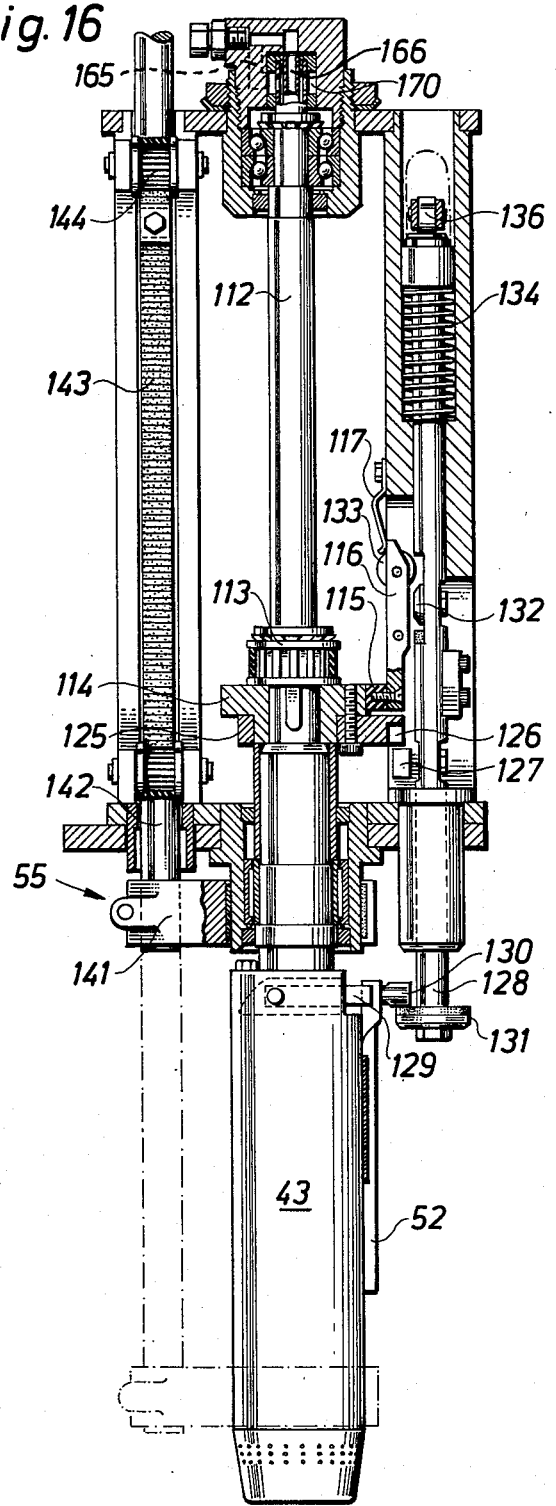
Figure 17:
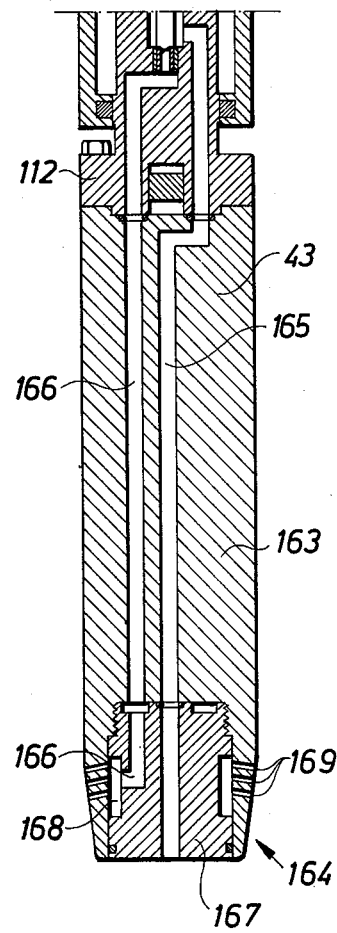
Figure 18:
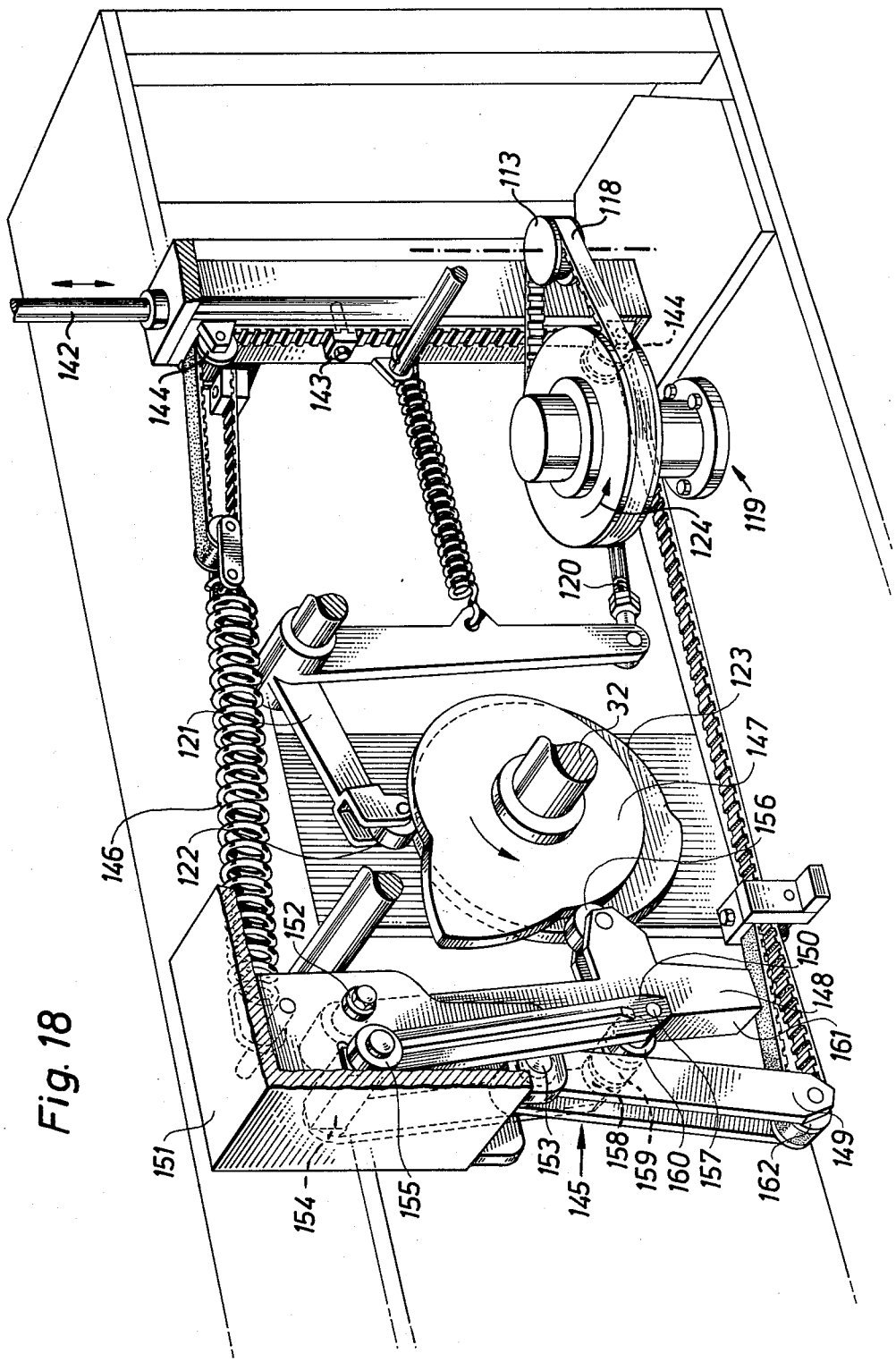
Figure 19:
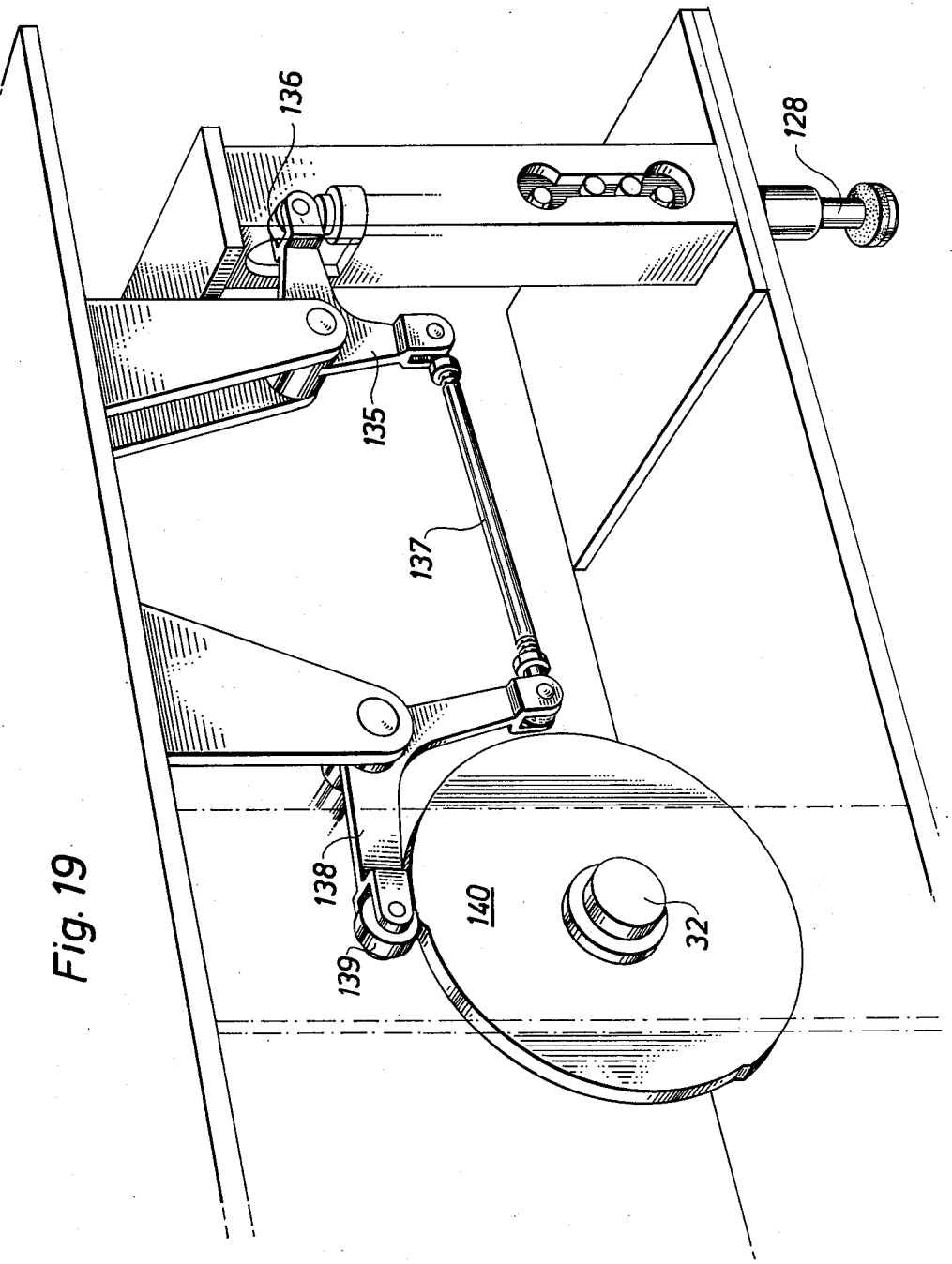
Figure 20:
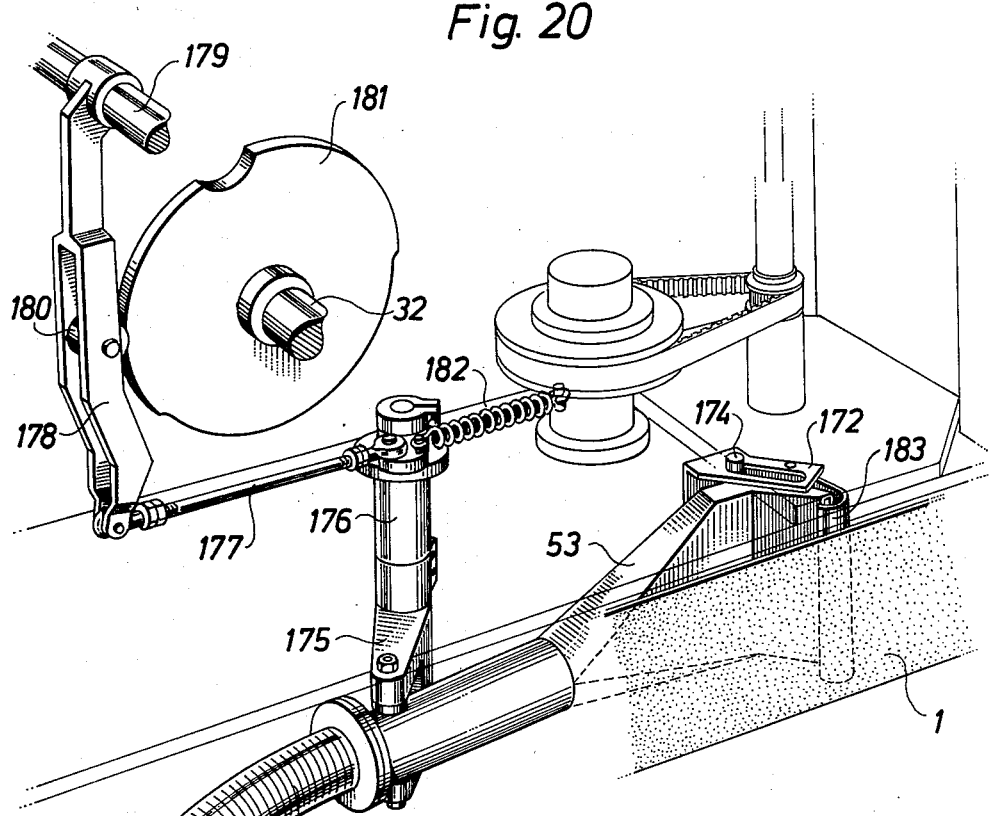
Figure 21:
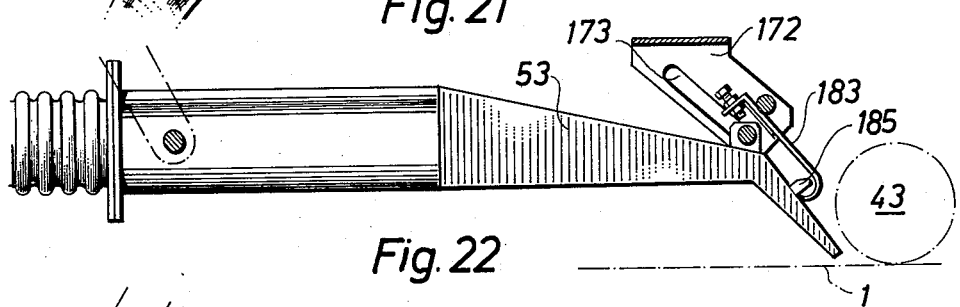
Figure 22:
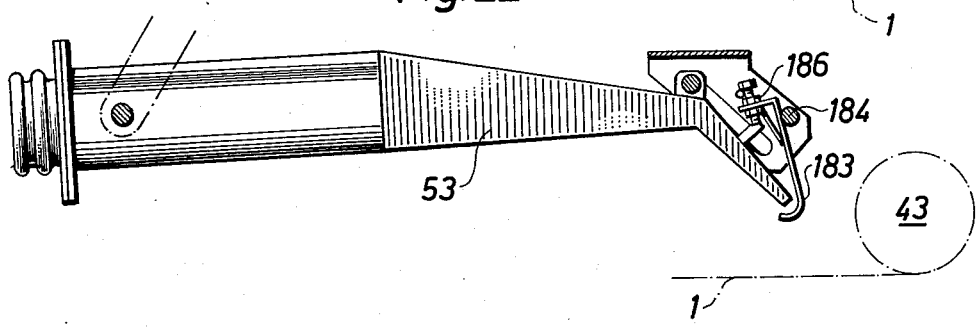
Figure 23:
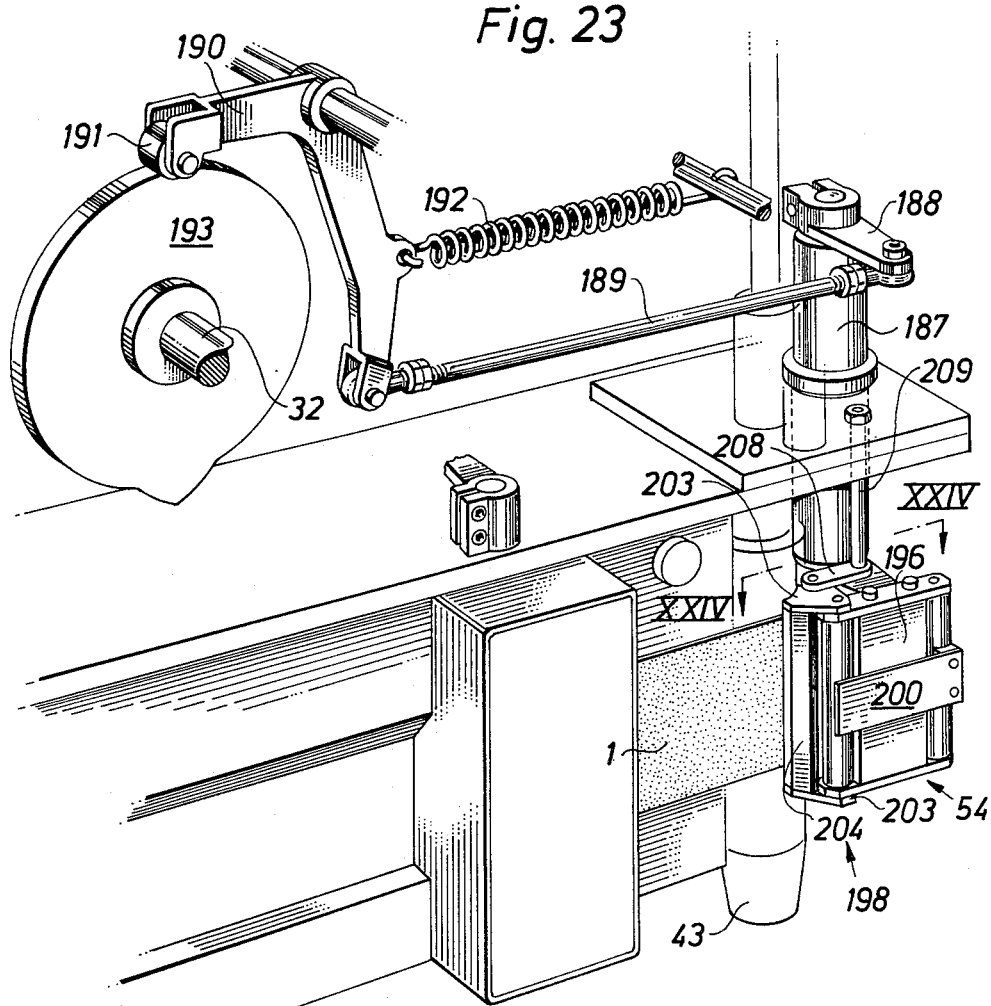
Figure 24:
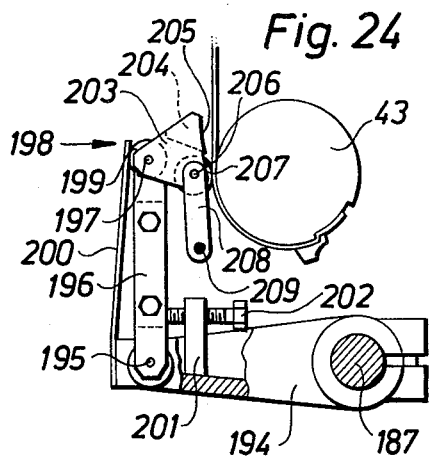
Figure 32:
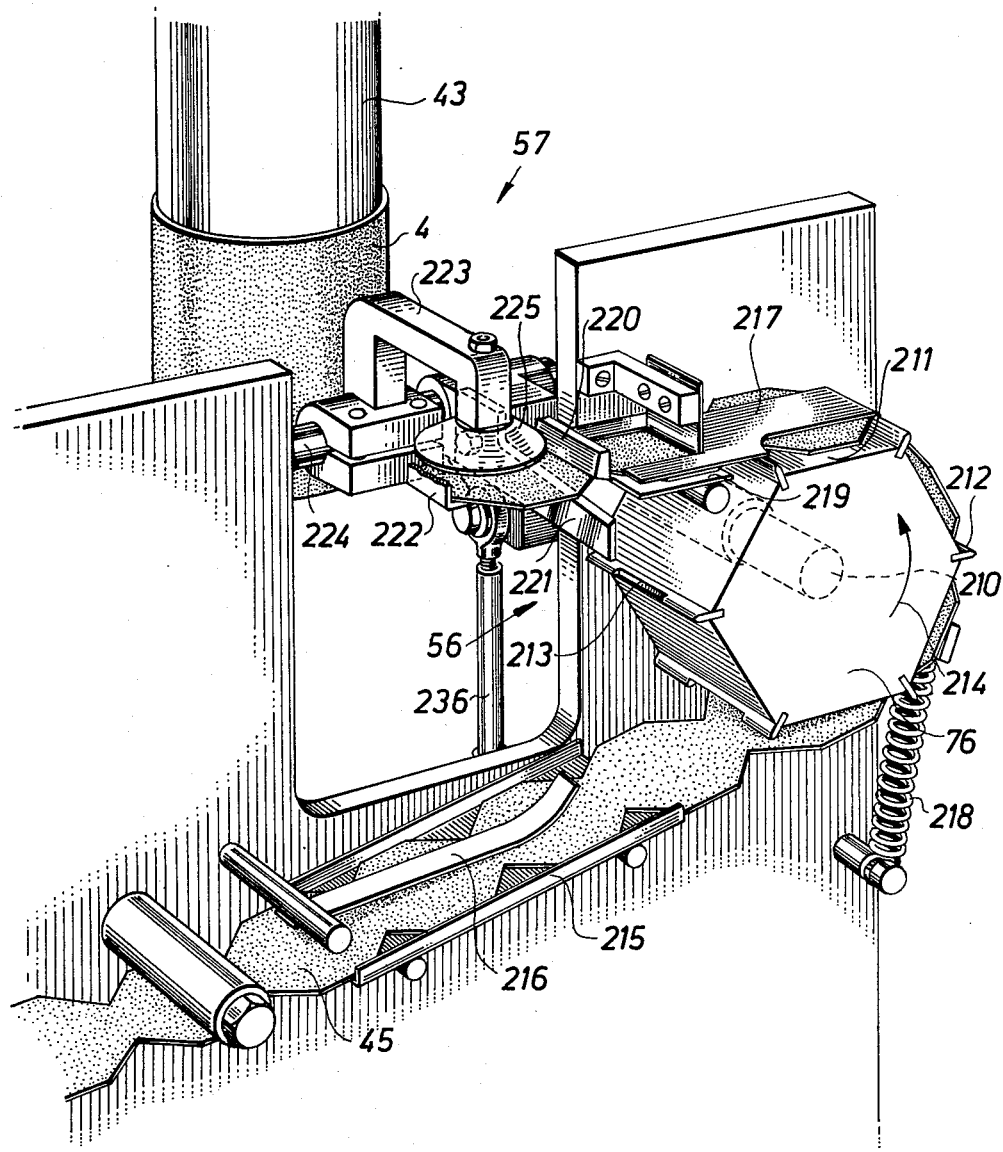
Figure 35:
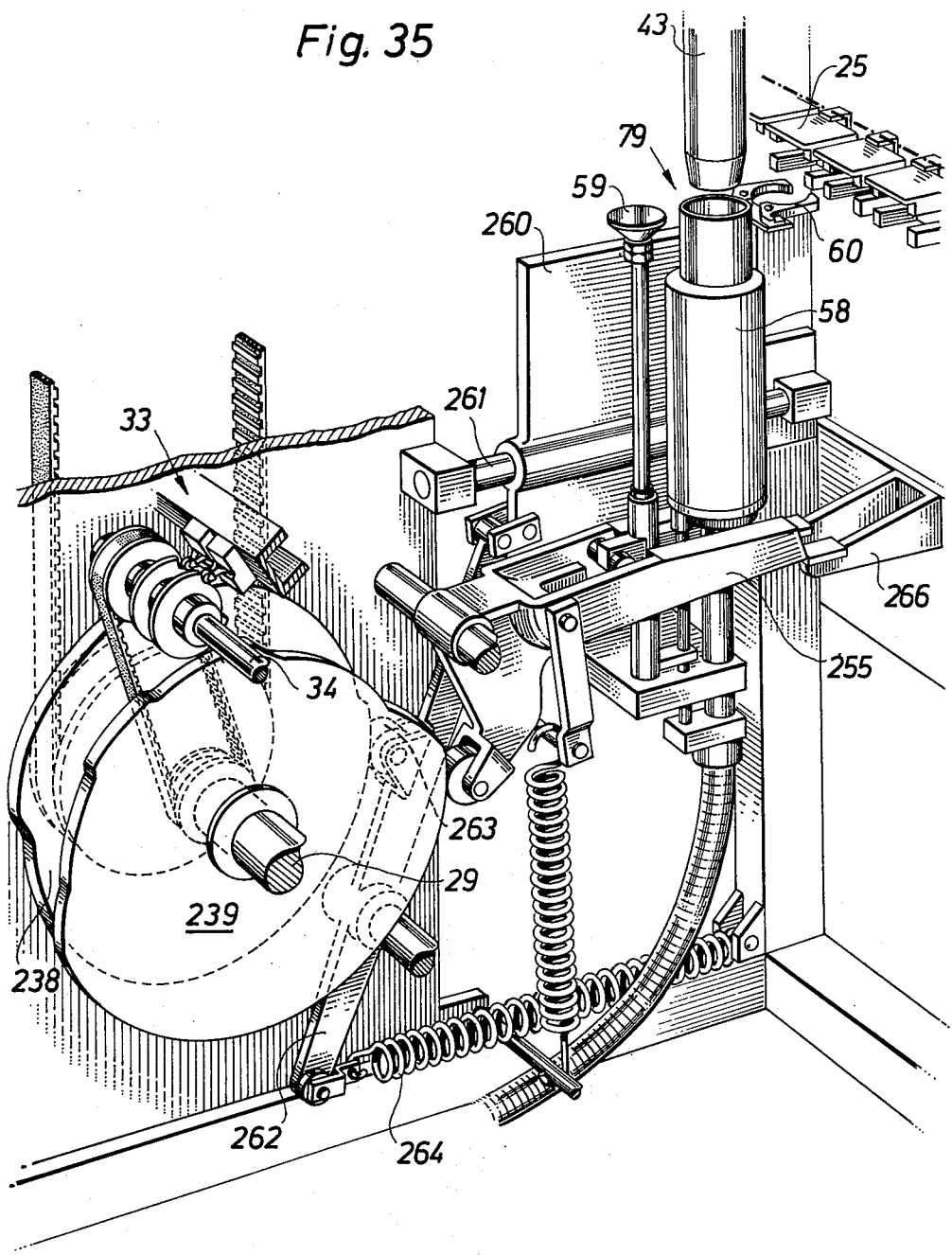
Figure 36:
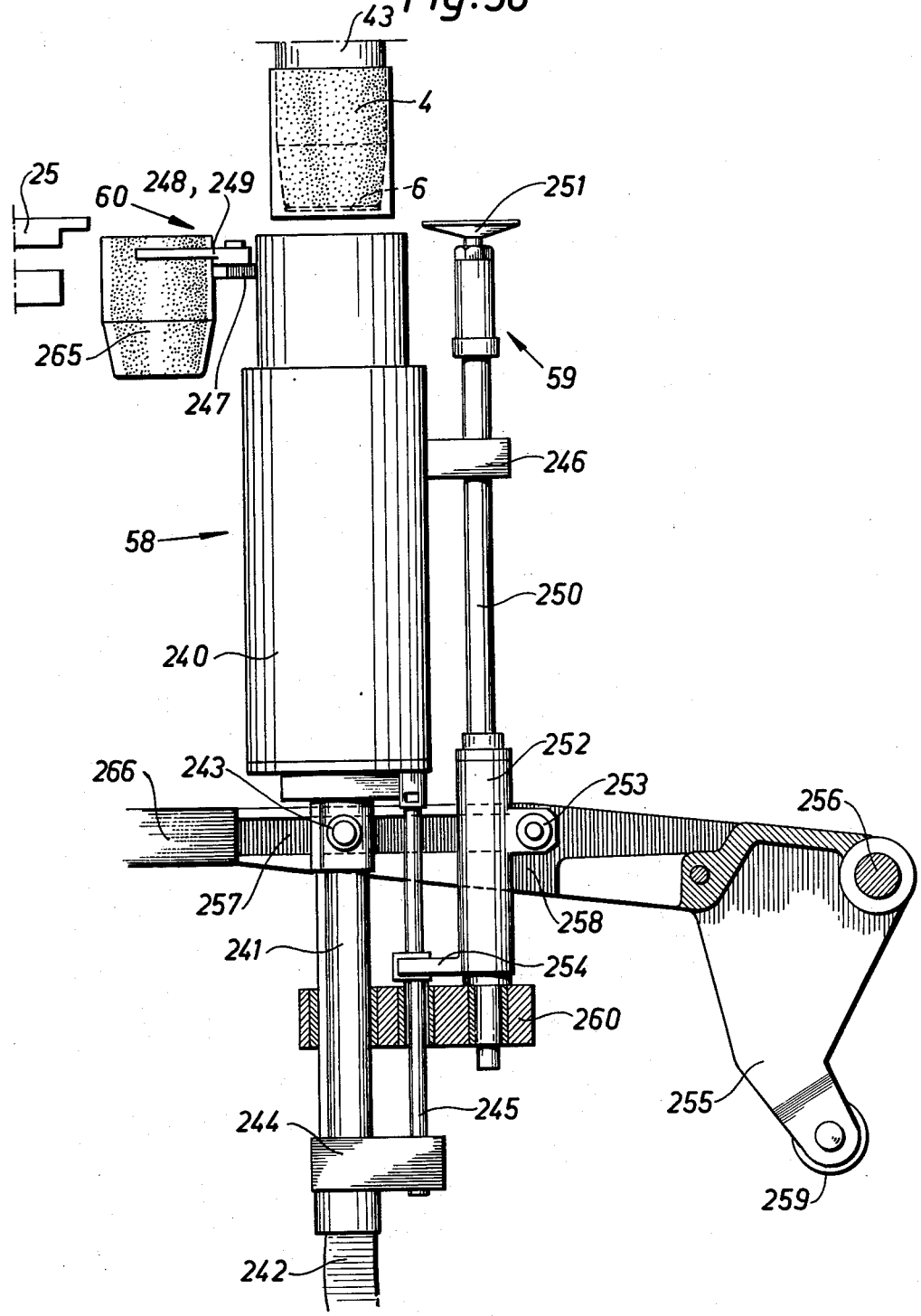
Figure 37:
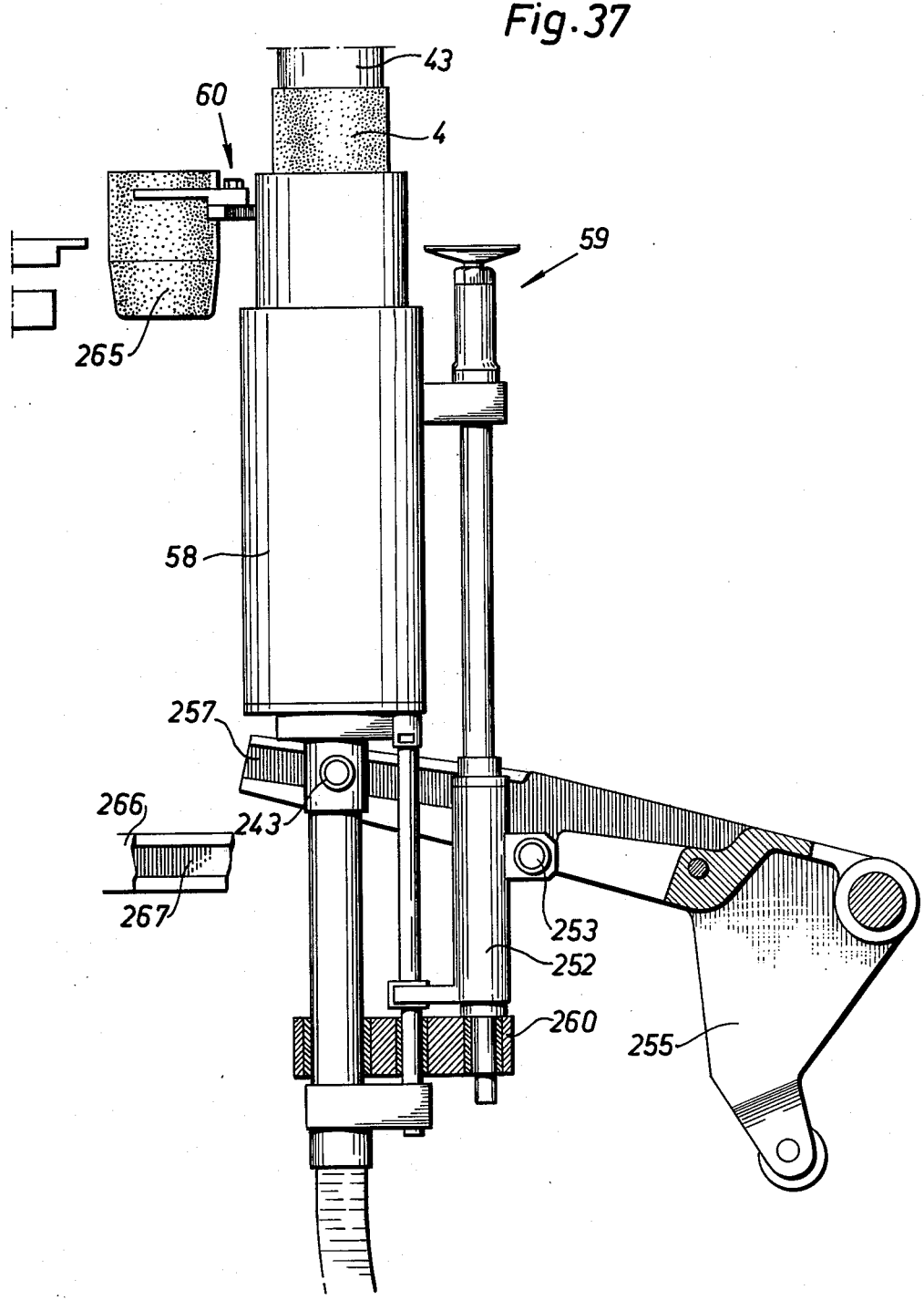
Figure 38:
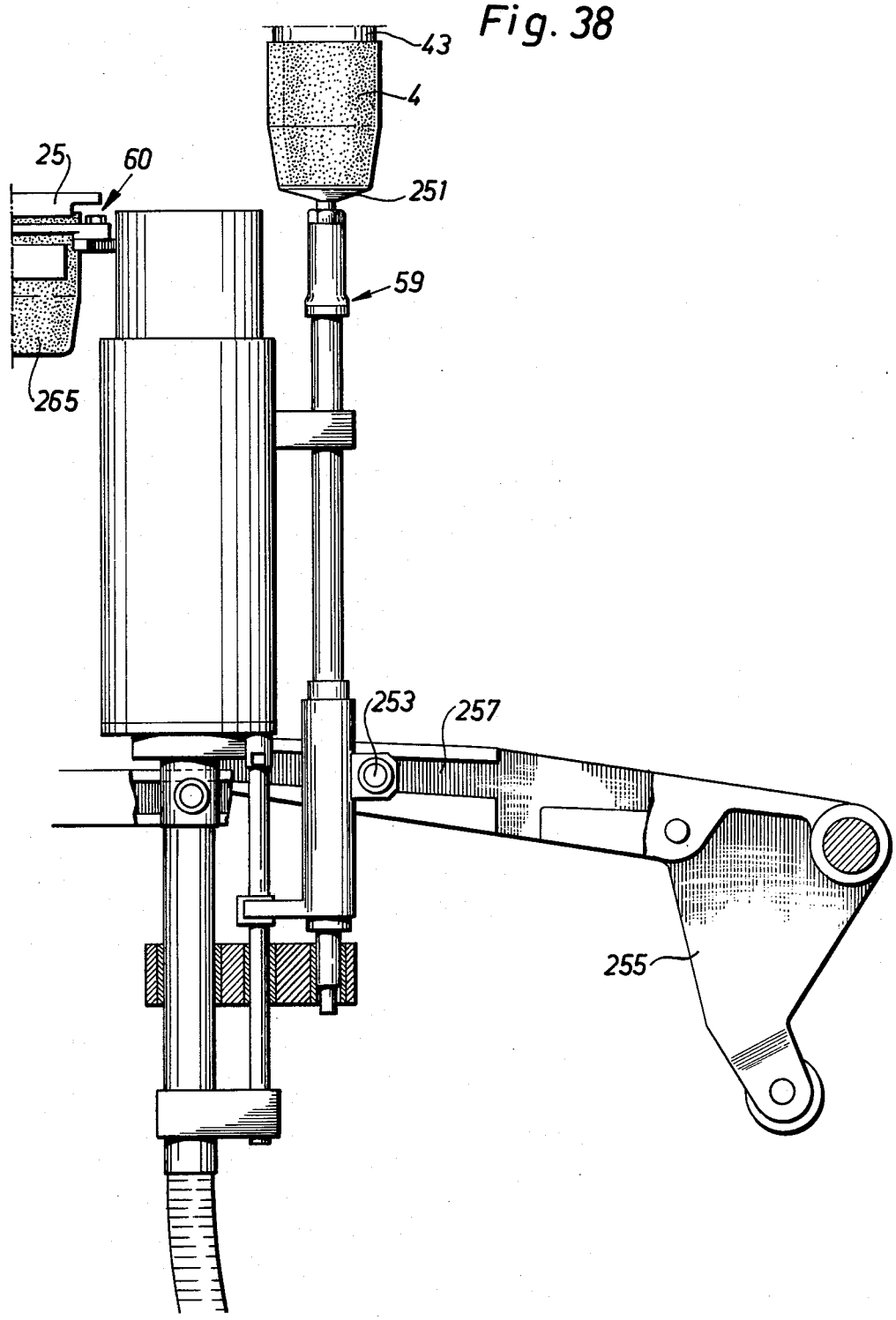
Figure 39:
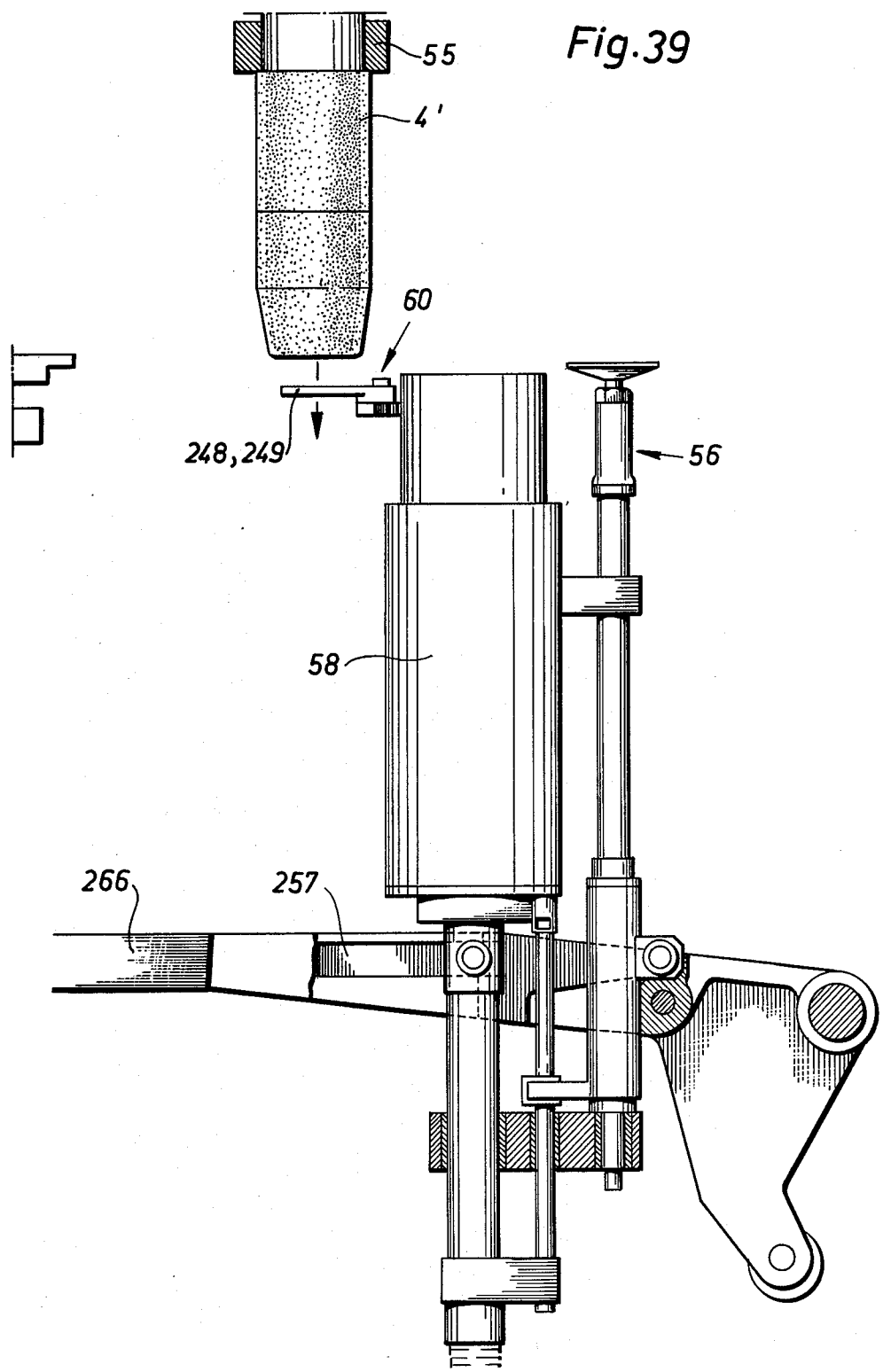
Figure 40:
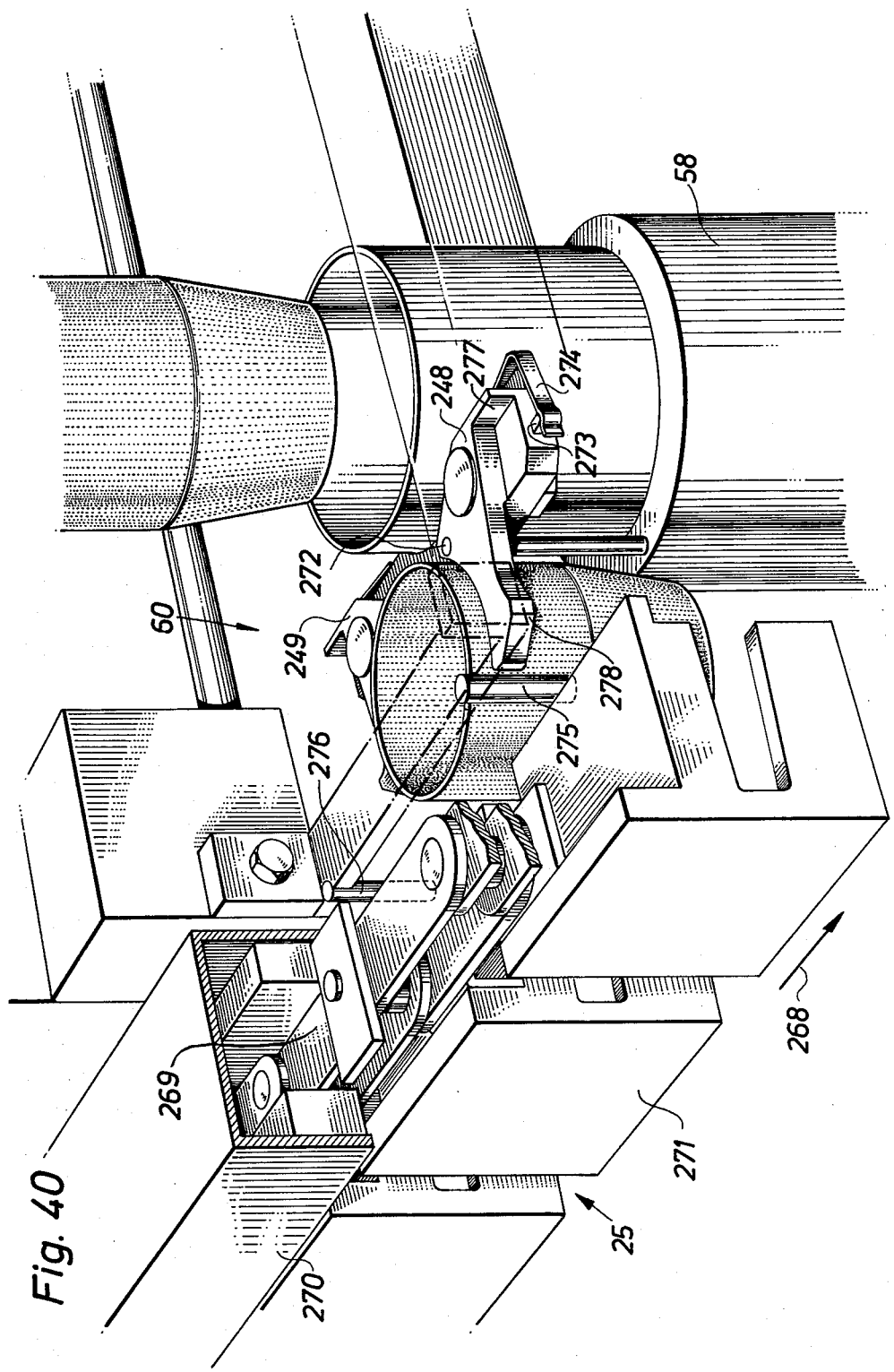

FIG. 9 shows in perspective view a unit included in the machine for the cutting of the web-shaped material into individual material sheets, FIG. 10 is a side view of a cutting device forming part of the arrangement in accordance with FIG. 9, FIGS. 11–15 show from above and partly in section the movement of the cutting device during the cutting of the material web, FIG. 16 is a partly sectional side view of a mandrel unit forming part of the machine, a driver element co-operating with the mandrel, a holding finger co-operating with the mandrel and a manoeuvering arrangement for these elements, FIG. 17 is a section through the mandrel shown in FIG. 16 and illustrates ducts provided in the mandrel, FIG. 18 shows in perspective view an arrangement for the rotation of the mandrel shown in FIGS. 16 and 17 together with an arrangement for the manoeuvering of the driver element shown in FIG. 16, FIG. 19 shows in perspective view an arrangement for the manoeuvering of the holding finger shown in FIG. 16, FIG. 20 shows in perspective view a hot air nozzle for the heating of the material strip and a manoeuvering arrangement for the hot air nozzle, FIG. 21 shows the hot air nozzle in accordance with FIG. 20 from the top and in advanced, active position, FIG. 22 shows the hot air nozzle in accordance with FIG. 20 from the top and in retracted, inactive position, FIG. 23 shows in perspective view an element co-operating with the mandrel for the forming of the material strip, and an arrangement for the manoeuvering of the element, FIG. 24 shows the web forming element in accordance with FIG. 23 from the top, FIGS. 25–31 show the web forming element, the mandrel, the holding finger and the hot air nozzle and show step-by-step their cooperating movements during the formation of a shell blank, FIG. 32 shows in perspective view an element for the feed of striplike connected base blanks, a cutting element for the division of the strip into individual base blanks and an element for the transfer of the individual base blanks to the end of the mandrel, FIG. 33 shows an arrangement for the manoeuvering of the element shown in FIG. 32, FIG. 34 is a detail view from the side and shows the base transfer element illustrated in FIG. 32, FIG. 35 shows in perspective view a unit located underneath the mandrel for the heating and joining together of the shell blank and the base blank and elements for the manoeuvering of the units, FIGS. 36–39 are side views of the units shown in FIG. 35, and in particular FIG. 36 shows the unit in a ready position, FIG. 37 the unit in shrinking position, FIG. 38 the unit in a base forming position and FIG. 39 the unit in a transfer position, FIG. 40 shows in perspective view the transfer of a finished formed packing container to a conveyor for the further transport to the filling machine.

In FIG. 1 is shown the step-by-step transformation of a striplike packing material to cup-shaped packing containers as it is taking place in the machine in accordance with the invention. The striplike packing material is delivered to the machine and is divided into separate sheets 1 of a suitable length. The packing material is provided with an inserted opening thread (not shown on the drawing) which extends close to and parallel with the top edge of the material. To facilitate the gripping of the end of this opening thread when the packing container is to be opened, the web-shaped material is cut off so that a projecting opening lug 2 is obtained at one side of each sheet and a corresponding cutout 3 at its other end. In the next processing stage the sheet 1 is heated up and is transformed to a tubeshaped shell blank 4 in that it is wound around a mandrel (not shown) and its two short ends are joined together to form a vertical overlap joint or longitudinal joint 5. The opening lug located at the one end of the sheet 1 is not joined to the surface of the shell blank but extends slightly outwards from the shell blank. The shell blank 4 is then displaced in relation to the mandrel, so that its bottom end extends beyond the end of the mandrel. Into the end extending beyond the mandrel a base blank 6 is then introduced to rest against the end of the mandrel, whereupon the shell blank as well as the base blank is heated up. In the course of this the shell blank will shrink so that it fits accurately to the shape of the mandrel, which is chosen in accordance with the desired shape the finished packing container is to obtain. In the example illustrated the packing container has a largely cylindrical upper part 7 and adjoining it a slightly conical lower part 8. The bottom edge zone of the shell blank 4 which extends along the end of the mandrel will on shrinking be folded-in against the end of the mandrel and the base blank 6 resting against the same. More particularly, the folded-in edge zone of the shell blank 4 will cover an edge zone of corresponding width on the base blank 6. Whilst the two edge zones are still in heated state an assembling and base forming device is pressed against the base of the packing container, as a result of which the edge zones are pressed together to a circular, impervious overlap joint. At the same time the outside base of the container has been given a suitable shape. In this manner the container has been given its final form and it is transported further, for filling and subsequent covering with a lid, to a filling machine which is preferably built together with the and forms one unit with the machine in accordance with the invention. In the filling machine lids 9 are punched out of a material web. The lids are thermoformed in conjunction with the punching process so that they obtain a recessed central area 10 and a flange 11 around the same. After the filling of the packing container with the desired contents, the upper edge of the packing container is heated, whereupon the likewise heated lid 9 is pressed down into the container, so that the flange 11 of the lid comes to rest against and is sealed to the container edge to an impervious joint. Subsequently the finished and closed container is moved away to be packed, for example, into larger collective containers.

In the following a preferred embodiment of the machine in accordance with the invention will be described in more detail, first in a general machine description which, with special reference to FIGS. 2 and 3, describes the machine in accordance with the invention, the filling machine co-operating with the machine in accordance with the invention, the drive of the total machine and the path of the packing material through the machine as it is being transformed to individual, filled packing containers.

After an account has been given of the design and function principles of the machine in the general machine description, the units included in the machine for the execution of the different forming phases will be described more closely in a special descriptive part. Here the different units will be described in the sequence in which they intervene in the manufacture of an individual packing container and with special reference to the different detail drawings.

GENERAL MACHINE DESCRIPTION

The machine in accordance with the invention is shown on the left in FIG. 2 and is indicated by the reference numeral 12. The manufacturing machine 12 is built together with a conventional filling machine 13 to a complete machine unit. The machine unit is described in the following in the form in which it is shown in FIG. 2, that is to say with only one manufacturing machine 12 connected to the filling machine 13. However, it is advantageous in practice to couple a filling machine together with a greater number of manufacturing machines, e.g. four or eight depending on the capacity of the filling machine and manufacturing machines. A machine unit with a greater number of manufacturing machines has the same design as the one shown in FIG. 2 except that it is extended towards the left through the addition of further manufacturing machines 12, which are placed parallel with the manufacturing machine shown and with a slight mutual distance, so that they can be served by the same driving and conveyor elements which will be described in the following in greater detail.

The filling machine 13 included in the machine unit is of a substantially conventional type and comprises a box-shaped frame 14 around which runs an endless apron feeder 15 with cutouts 16 for the packing containers. The parts of the conveyor 15 present on the upper side of the frame 14 proceed in the direction from the manufacturing machine 12, that is to say in the direction from left to right on the drawing. The conveyor 15 runs over four guide rollers 17, one of which is driving.

Inside the box-shaped frame 14 is a main motor 18 which via a chain drives a main shaft 19. From here a division of the driving power into three different directions takes place, namely firstly via an indexing gear box 20, arranged at the one end of the main shaft 19, and angular gears 21 connected to the same and a chain unit 22 to the conveyor 15 of the filling machine 13, secondly via a chain unit 23 arranged at the other end of the main shaft 19, and an angular gear 24 to a transport chain 25, which transfers cups from the manufacturing machine 12 to the filling machine 13, and thirdly via a further chain unit, arranged at the last mentioned end of the main shaft 19, which transmits the force to a layshaft 27 which is situated alongside the frame 14 of the filling machine 13 and extends parallel with the main shaft to the manufacturing machine 12. In the manufacturing machine 12 the force is transmitted from the layshaft 27 by means of a chain 28 to a bottom camshaft 29. The bottom camshaft in turn transmits the driving force via two toothed belts 30 and 31 to an upper camshaft 32 and a camshaft 34 of a programming mechanism 33 respectively. The cam discs of the lower and upper camshafts 29 and 32 respectively then transmit the driving force via lever arms to the different elements included in the manufacturing machine, which will be described in more detail in the following.

From the layshaft 27 is also driven via a belt 35 a magazine roll 36 for web-shaped return material from which the lids 9 are punched which roll 36 is arranged on the top of the filling machine 13.

Each manufacturing machine 12 may be regarded as consisting of three box-shaped frame sections within which the different elements are collected in groups, namely a first or upper machine section 37, a second or lower machine section 38 situated underneath it and a roll stand 39 behind it. The roll stand 39 supports a freely rotating material roll 40, from which a material web 41 is conducted via a guide pulley 42 into the upper machine section 37 to be divided up into separate sheets 1 and to be transformed to tube-shaped shell blanks 4 by winding around a mandrel 43 supported in the upper or first machine section 37.

In the roll stand 39 a second material roll 44 is also supported so that it is freely rotatable. From the material roll 44 runs a continuous web 45 of base blanks 6 which passes into the lower machine section 38 and is divided up into separate base blanks, each of which is joined to a formed shell blank 4 so as to produce a cup-shaped container which is open at the top. The container thus formed is then passed to the transport chain 25, which conveys the container to a cutout 16 in the conveyor 15 of the filling machine 13. By means of the conveyor 15 the cup is then moved first of all to a position underneath a filling unit 46 arranged on the top of the filling machine 13 so as to be filled with the desired quantity of contents, whereupon the conveyor 15 is indexed and moves the cup underneath a lid unit 47, also arranged on the top of the filling machine 13, which from a web of lid material running between a lid material roll 48 and a return material roll 36 punches the individual lids 9, thermoforms them so that the recessed central area 10 and the flange 11 are obtained, heats the flange 11 as well as the upper edge of the cups present in the conveyor and seals the lid so that the filled packing container is closed. By further indexing of the conveyor 15, the finished and closed packing container is moved to a position right before a chute 49 into which the container is passed by means of devices not shown on the drawing for further transport and possible packaging into collective container or the like.

The detailed construction of and the connection between the different processing units forming parts of the manufacturing machine 12 can be recognized more clearly from FIG. 3, which is a side view of an upper and lower machine section 37, 38 of a manufacturing machine 12, seen from the left in FIG. 2.

FUNCTION DESCRIPTION

The material web 41 delivered from the material roll 40 (FIG. 2) passes into the first or upper machine section 37 from the left (FIG. 3) and is fed by means of a feed unit 50 in the direction of the mandrel 43. The feed unit 50 performs a linear reciprocating movement parallel with the material web 41 and feeds the same step-by-step in the direction towards the mandrel. The feed unit 50, like all the other units located in the first or upper machine section 37, is driven via a lever system and belts or the like from the can discs of the upper camshaft 32. The various elements arranged for this purpose and the method for transmitting and converting the driving motion to the individual units are dealt with in more detail in the following with reference to the subsequent detail drawings.

Following the feed unit 50 (seen in the direction of movement of the material web 41) there is a cutting device 51 which divides the material web 41 into a material length or sheet suitable for the forming of each shell blank 4. Simultaneously with the cutting movement of the cutting device 51, the front end of the sheet 1, situated close to the peripheral surface of the mandrel 43, is clamped against the mandrel surface by means of a holding finger 52 (FIG. 16), and after the completion of the cutting the mandrel 43 commences to rotate. As soon as the mandrel commences to rotate, a hot-air nozzle 53 is conveyed into an active position, so that a hot air stream is blown at an angle between the shell surface of the mandrel and the touching sheet ends. Thus the material is heated to such an extent that the transformation of the sheet to tube-form is facilitated. When the mandrel 43 has almost completed one turn and when the back end of the sheet 1 is directly in front of the mouth of the hot-air nozzle 53, the rotation of the mandrel 43 stops, with the result that the front and back ends of the sheet 1, situated right opposite one another, are exposed to the hot-air jet for a longer time than the remaining part of the material sheet and are heated to the softening temperature of the material. Then the heated and mutually overlapping sheet ends are pressed together to an overlap joint by means of a pivotable web forming device 54 which, during the greater part of the mandrel rotation, presses the material sheet lightly against the shell surface of the mandrel, but which is not pivoted so as to produce the vigorous pressing together of the two sheet ends. After the completion of the longitudinal joint the mandrel rotates a little further, so that it completes a full turn and once more attains its starting position.

After the web forming device 54 and the hot-air nozzle 53 have returned to their rest position, the formed shell blank 4 is detached and is moved, by means of a driver element 55 (FIG. 16), in the direction downwards along the mandrel 43 to such a position at the bottom end of the mandrel that the bottom end of the shell blank extends a little beyond the end of the mandrel.

The processing of the tube-shaped shell blank 4 is now taken over by the processing units arranged in the lower machine section 38 which are driven via levers and similar elements from the cam discs of the lower camshaft 29. The driving arrangement for the different units and their details will be described later with reference to the special detail drawings.

By means of a base feed wheel 76 the bases 6, stored in the form of a continuous web 45 in the roll stand 39, are fed into the lower machine section. The web 45 passes around the step-by-step rotating base feed wheel 76 to a cutting element 56 (FIG. 32) arranged in the vicinity of the same, which divides the continuous web 45 into separate base blanks 6. Directly adjoining the cutting element 56 there is a base transfer device 57, which grips the separated base blank 6 and places it so as to rest against the underside of the mandrel 43, where the base blank 6 is retained by means of vacuum in such a position that it is surrounded by the edge zone of the shell blank 4 extending below the bottom end of the mandrel.

With the shell blank 4 and the base blank 6 in this position a tubular heating element or hot-air oven 58, arranged underneath the mandrel, is raised to an upper active position in which it surrounds the bottom end of the mandrel 43 and heats the packing container blanks 4, 6 situated on the same. As a result of the heating the shell blank 4 shrinks and adheres accurately to the shape of the mandrel 43. The edge zone of the shell blank 4, which extends beyond the bottom end of the mandrel, similarly to the base blank 6, owing to its placing in the lower, warmer section of the oven, will be heated to a greater extent that the remaining, upper portion of the shell blank 4. This has the result that the edge zone of the shell blank will shrink to adhere against the edge zone of the base blank 6, and, before the shrinking oven 58 is withdrawn again, the material in the two edge zone will have attained its softening temperature.

To the left of the heating element or oven 58 and parallel with the same there is an assembling device 59 (FIG. 3) which together with the shrinking oven 58 and a gripping element 60 arranged on the top edge of the same (FIG. 36) is combined to a unit 79. When the shrinking oven is lowered to its rest position the said unit 79 is moved one step towards the right (FIG. 3), whereupon the assembling device 59 is raised to rest against the still soft edge zones of the base blank and the shell blank so as to press these together to an impervious overlap joint. As a result of this the forming of the packing container is finished, and the assembling device 59 is lowered again to its rest position shown on the drawing. Subsequently the unit 79 consisting of the assembling device 59, the shrinking oven 58 and the gripping element 60 is indexed towards the left so that the gripping element 60 will be situated straight under the mandrel 43. The driver element 55, with the help of an intermediary, new shell blank formed during the shrinking procedure, pushes the finished container down into the gripping element 60, and when, during the next operation cycle, the unit is moved once more towards the right, the container is transferred to the transport chain 25 to be conveyed onto the filling machine.

SPECIAL MACHINE DESCRIPTION

MATERIAL FEED UNIT

The feed unit 50 and its driving arrangement will now be described in detail with special reference to FIGS. 4-8. The feed unit itself is shown in FIGS. 7 and 8 and comprises two carrier plates 61, 62 which are mutually parallel and largely triangular in shape. The carrier plates 61, 62 are provided at their two top corners with drilled-through holes 63 by means of which the feed unit is suspended so that it can slide on two parallel guides 64, 65. Between these runs an operating shaft 66, which is supported so in the carrier plates 61, 62, that it can rotate, but is not axially movable. On the part of the operating shaft 66 which is situated between the carrier plates there are two nipping arms 67, 68 in fixed connection with the operating shaft which extend obliquely downwards from the operating shaft 66 and are pivotable between an active position (fully drawn lines) and an inactive position (dash-dotted lines). The pair of nipping arms 67, 68 co-operates with a counterhold 69, which is supported so that it can rotate on a shaft 70 extending between the bottom corners of the largely triangular carrier plates 61, 62. The counterhold 69 is pivotable between two positions, namely an active position (fully drawn lines in FIG. 8) and an inactive position (dash-dotted lines). The counterhold 69 is operated, like the pair of lever arms 67, 68 between the active and the inactive position by turning of the operating shaft 66. The counterhold 69 is not connected directly to the operating shaft 66, however, but is acted upon via a toggle joint assembly, which comprises a lever arm 71 connected rotatably to the operating shaft 66 and extending in the direction towards the counterhold 69, an axial sleeve 72 which is movable along the lever arm 71 and which by means of a helical spring 73 surrounding the lever arm 71, is acted upon in the direction towards the counterhold 69. The sleeve 72 has on its underside two U-shaped cutouts 74 situated opposite one another, which are open downwardly and which serve to accomodate two pins 75 arranged at the upper end of the counterhold 69. The sleeve 72, which is axially slidable along the working lever 71, is pressed with the help of the spring 73 permanently to rest against the pins 75.

When the nipping arms 67, 68 and the counterhold 69 are to be pivoted e.g. from the active to the inactive position, the operating shaft 66 is turned in anticlockwise direction which has the result that the nipping arms 67, 68 as well as the lever arm 71 are pivoted in anticlockwise direction. The lever arm 71 acts via the sleeve 72 in a toggle-joint type manner upon the upper end of the counterhold 69, so that the counterhold pivots clockwise to the inactive position.

The operating shaft 66 drives not only the described parts for the holding or releasing of the material web 41 arranged in the feed unit 50, but attends also to the reciprocating movement of the feed unit 50. The feed unit 50, as mentioned earlier, is supported so that it can be displaced on the two parallel guides 64 and 65 between which runs the operating shaft 66. The one end of the operating shaft 66, as mentioned earlier, is supported so that it can be turned but not axially displaced in the feed unit 50 which means that an axial movement of the operating shaft displaces the feed unit 50 in either direction along the guides 64, 65. The other end of the operating shaft 66 is supported so that it can be turned but not axially displaced in a bearing yoke 77, which like the feed unit 50 is supported by and displaceable along the guides 64, 65. The bearing yoke 77 is provided on its upper side with an attachment 78, by means of which the bearing yoke is connected to a toothed belt 80 which over a certain distance runs parallel with the guides 64, 65. The toothed belt 80 runs over guide pulleys 81 and is connected at its one end to a lever arm 82 which rests against and is acted upon by a feed cam 83 supported by the upper camshaft 32. At the other end of the toothed belt 80 is a return spring 84, which not only keeps the toothed belt continuously stretched, but also acts upon the lever arm 82 so that the same rests continuously against the periphery of the feed cam 83 during the rotation of the camshaft and thus imparts to the toothed belt 80 a reciprocating movement which is accurately controlled by the cam 83.

To make possible an adjustment of the length of the working and return stroke of the feed unit 50, the lever arm 82 is designed so that the distance between the point around which the lever arm 82 pivots and the roller 85 at the lower end of the lever arm which acts upon the toothed belt 80 can be adjusted by means of an adjusting device 86.

One of the guide pulleys 81 over which the toothed belt 80 passes is provided with an eccentric bearing 87 which by means of a pneumatic cylinder 88 can be turned so that the path of the toothed belt 80 is lengthened or shortened. The purpose of this is to make possible an adjustment of the position of the decoration provided on the material web 41, and this is achieved in the following manner. The material web 41 entering into the machine is provided with photocell marks arranged at equal intervals. These are scanned continuously by means of a photo-cell arranged close to the feedpath of the material web (not shown on the drawings), and the pulses transmitted by the photo-cell as a function of the photo-cell marks are compared continuously with the pulses from the programming mechanism 33 arranged in the machine, which is set to transmit pulses at a certain point in the cycle. Thus, if a pulse from the photo-cell coincides with a pulse from the programming mechanism, the feed is correct and the pneumatic stepping cylinder does not act upon the eccentric bearing 87 of the pulley 81. To ensure that the length of the feed stroke is kept at the correct value a certain overfeed always takes place, however, which is set by an extension of the lever arm 82 by means of the adjusting device 86. A certain time difference will now arise between the pulse from the photo-cell and the pulse from the programming mechanism 33, which time difference is scanned and will control a pneumatic valve which acts upon the stepping cylinder 88 so that the same, during the working stroke of the lever arm 82, turns the eccentric bearing 87 of the guide pulley 86 and thereby shortens the path of the toothed belt 80 which means that the working stroke of the feed unit will be somewhat shorter. During the return stroke the eccentric bearing 87 is restored to neutral position, and at the working stroke the difference between the pulses will be scanned once more and the said correction of the length of stroke will be performed.

The turning movement of the operating shaft 66 which acts upon the nipping arms 67, 68 and the counterhold 69 between the active and inactive position is brought about in that a lever arm 89 (FIG. 6) supported on the operating shaft 66 is acted upon each time the feed unit 50 reaches either of the two end positions of the reciprocating movement. The lever arm 89 is mounted at the end of the operating shaft 86 which is supported in the bearing yoke 77, and the lower end of the lever arm extends below the bearing yoke 77 where it carries a pin 90 which is parallel with the operating shaft 66 and projects from both sides of the lever arm 89. The pin 90 is arranged so that it is acted upon by two rocker arms 91 which are mounted at the same level as the two end positions of the bearing yoke 77 on an intermediate shaft 92 arranged underneath the operating shaft 66. The intermediate shaft 92 is supported rotatably in the machine frame and arranged so that it is turned between two positions. The turning movement is achieved by means of a cam 93 arranged on the upper camshaft 32, this can being referred to hereinafter as the holding cam, which via a lever arm 95, kept in contact with the holding cam 93 by means of a spring 94, and a lever arm and link unit 96, connecting the lever arm 95 to the intermediate shaft 92, transmits the movement determined by the holding cam 93 to the operating shaft 66, so that the same brings the nipping arms 67, 68 and the counterhold 69 to the active, material-holding position when the feed unit 50 is in its rear turning position and to the inactive, material-releasing position when the feed unit is in its front turning position. In this way the step-by-step feed of the material web to the subsequent units included in the machine is achieved.

CUTTING DEVICE

The cutting device 51 arranged downstream of the feed unit 50 will now be described in more detail with special reference to FIGS. 9 and 10, and the movement of the cutting device during the cutting off process will be described with special reference to FIGS. 11–15.

The cutting device 51 comprises two guides 97 arranged at right angles to the material web 41, which are placed at some distance from one another and which are provided on their surfaces facing one another with V-shaped grooves in which is supported in a slidable manner the rear end of a knifeholder 98. The knifeholder is provided at its front end with a knife 99 and a pressure plate 100 located immediately next to it, which is displaceable and is acted upon in the direction of the material web 41 by means of two compression springs 101. The knife 99 as well as the pressure plate 100 are arranged to co-operate with a fixed counterhold 102 arranged on the other side of the material web 41.

The knifeholder 98 moves during operation of the machine in working and return stroke and is actuated by means of a cam 103 arranged on the upper camshaft 32, which cam 103 will be referred to hereinafter as cutting cam. A knee lever 105, pressed against the cutting cam by means of a spring 104, acts via a linkage and lever unit 106 upon a vertical shaft 107, which is supported so that it can rotate in the machine frame and is located close to the knifeholder 98. The rotating movement of the shaft 107 is transmitted via a forked driver 108 and coupling bushes 109 carried by the fork arms to the knifeholder 98 which is thereby induced to move in a reciprocating movement determined accurately by the cutting cam 103.

FIGS. 11–15 show schematically the cutting process. In FIG. 11 the knifeholder 98 is in an inactive position in which the knife 99 as well as the pressure plate 100 are at a distance from the material web 41. The material web 41 moves in the direction of the arrow 110 and at some distance from the counterhold 102 situated behind the material web. In FIG. 12 the advance of the material web 41 caused by the feed unit 50 has stopped and the cutting device 51 has been activated. More particularly, the knifeholder 98, by pivoting of the shaft 107, has been moved in the direction towards the material web 41 and which is pressed by the spring-loaded pressure plate 100 to rest against the counterhold 102. In FIG. 13 the knifeholder 98 has been actuated further in the direction towards the material web 41, and the knife 99 has now penetrated the material web and has separated a material sheet 1 which at its front end is joined to the mandrel 43 and by virtue of the rotation of the same is moved further in the direction of the arrow 111. In FIG. 14 the return movement of the knifeholder 98 has been started, and the knife 99 has left the material whilst the pressure plate 100 continues to retain the material web 41 so as to prevent the same from sliding back. The sheet 1 has been moved further by the mandrel 43 over a distance in the direction of the arrow 111. In FIG. 15 the knifeholder 98 has been drawn back to such an extent that the pressure plate 100 has also started to leave the material which can now be advanced further forwards by a sheet length by the feed unit 50.

MANDREL UNIT

The mandrel 43 is mounted (FIG. 16 and 17) at its upper end on a mandrel shaft 112, which extends upwards and is supported so that it can rotate in the upper part of the machine 37. At the lower end of the mandrel shaft 112, there is a belt pulley 113 rotatable together with the mandrel shaft and the mandrel, by means of which the mandrel 43 is adapted to be rotated intermittently. Directly underneath the belt pulley there is a brake disc 114, which is also mounted fixed in relation to the mandrel and the mandrel shaft, against the peripheral surface of which rests a brake shoe 115. The brake shoe 115 is mounted on a brake arm 116 and is urged to rest against the brake disc 114 by means of a brake spring 117.

The construction of the mandrel 43 is evident from FIG. 17. The mandrel comprises a main body 163 which is substantially cylindrical but has a conical area 164 at the bottom. Two ducts 165 and 166 extend vertically through the main body of the mandrel 163. At the bottom end of the main body there is a nose part 167 screwed into the main body into which ends the duct 166 in an annular groove 168. The groove connects the duct 166 to a number of peripheral holes 169 provided in the lower conical region 164 of the main body 163 of the mandrel. The duct 165 continues in an axial prolongation through the nose part 167 and ends at the bottom end of the same.

The main body 163 of the mandrel is in firm connection at its upper end with mandrel shaft 112 and the two ducts 165 and 166 continue in the mandrel shaft 112 and run concentrically up through the same to end at the upper end of the same via a rotatable coupling 170 in an inlet plug each (only one of which is visible in FIG. 16).

The two air ducts 165 and 166 can be connected optionally to a source of vacuum or of pressure respectively, which is done by means of known devices which are not described in detail. The duct 165 ending in the free end of the mandrel is connected to a source of vacuum when the base blank 6 is placed against the end of the mandrel, as a result of which the base blank 6 is retained during the further course of operation. The holes 169 of the air duct 166 ending at the conical region 164 of the mandrel 43 are connected to the source of vacuum in connection with the shrinkage of the shell blank 4 situated on the mandrel end, the vacuum contributing to make the lower part of the shell blank adhere accurately against the conical region 164. When the base blank 6 has been joined to the shell blank 4 and the container is to be detached from the mandrel 43 with the help of the driving element 55, the two air ducts 165 and 166 are connected to the source of pressure, which prevents that any vacuum preventing the detachment of the container from the mandrel could arise between the container and the mandrel end.

The arrangement for the driving of the mandrel 43 is illustrated in FIG. 18 and comprises the said belt pulley 113 fitted on the mandrel shaft 112, which, by means of an endless toothed belt 118, is connected to a freewheel arrangement 119. The freewheel arrangement 119 is turned by means of a lever arm (not shown), which via a link 120 is connected to one arm of a bell crank lever 121. The other arm of the bell crank lever 121 carries a freely rotatable roller 122, which is acted upon by means of a helical spring to rest against a cam 123 (hereinafter called rolling cam) arranged on the upper camshaft 32. On rotation of the upper camshaft 32 the contour of the rolling cam 123 will impart a reciprocating movement to the bell crank lever, which via the link 120 and the lever arm (not shown) is transmitted to the freewheel arrangement 119. The rolling cam is designed so that for each turn of the camshaft 32 the freewheel arrangement 119 is turned substantially one quarter of a turn in the direction of the arrow 124. When the freewheel arrangement 119 is turned a quarter turn, this will bring about, owing to the transmission ratio between the two belt pulleys of the belt 118, that the mandrel 43 is turned substantially a whole turn, i.e. the transmission ration is 1:4.

The freewheel arrangement 119 makes it possible for the mandrel owing to its inertia to continue rotating after the turning has stopped, and to prevent this the brake shoe 115 is pressed with the help of the brake spring 117 against the brake disc 114 mounted on the mandrel shaft 112 during the rotation of the mandrel.

Directly underneath the brake disc 114 mounted on the mandrel shaft 112 there is an indexing sleeve 125 firmly mounted on the shaft (FIG. 16), which on its underside has a V-shaped indexing cutout 126, which is intended to co-operate with a vertically movable indexing roller 127, which, when it is moved into the indexing cutout 126, indexes the mandrel 43 to the exact rest position and retains it there.

Parallel with the mandrel shaft 112 extends a vertically displaceable operating rod 128 for the operation of the holding finger 52 supported movably in the mandrel 43. The holding finger 52 is provided at its upper end with a bearing part 129 extending at an angle to the finger, which is supported pivotally in the lower end of the mandrel shaft 112 and is spring-loaded in such a direction that the holding finger 52 normally rests against the outer surface of the mandrel. At the upper end of the holding finger 52 there is also a projecting lip 130, which, when the mandrel 43 is in its rest position, is situated directly above a disc 131 arranged at the bottom end of the operating rod 128. A lifting of the operating rod 128 will therefore result in the lip 130 being acted upon in upwards direction so that the holding finger 52, against the action of the spring force, is withdrawn from the surface of the mandrel 43.

On the operating rod 128 is also supported the indexing roller 127 mentioned earlier. When the operating rod 128 is in its bottom position the indexing roller 127 is situated at some distance below the indexing sleeve 125 arranged on the mandrel shaft 112. When after the rotation of the mandrel the operating rod 128 is urged upwards for the lifting of the holding finger 52, the indexing roller 127 will be lifted upwards and into the V-shaped indexing cutout 126 in the indexing sleeve 125, which indexes the mandrel to the exact rest position. At the same time a release lip 132 arranged a little higher up on the operating rod 128 will act via a roller 133 upon the brake arm 116 so that the brake shoe 115, against the action of the spring 117, is withdrawn from the brake disc 114, so as not to prevent the indexing of the mandrel 43 to the exact rest position. At the upper end of the operating rod 128 there is a helical spring 134 which urges the operating rod upwards to rest against roller 136 (FIG. 19) which is freely rotatable at the one end of a bell crank lever 135. The bell crank lever 135 is supported so that it can pivot in the upper part of the machine 37 and is connected at its other end via a link 137 to the one arm of a further bell crank lever 138, whose other arm rests via a freely rotatably supported roller 139 against a cam 140 (hereinafter called finger cam) arranged on the upper camshaft 32. The roller 139 of the bell crank lever 138 will thus be urged via the spring 134 to rest against the finger cam 140, as a result of which the operating rod 128 will be shifted vertically upwards or downwards in rhytm with the rotation of the upper camshaft 32. More particularly, the operating rod 128 is lifted upwards to an upper position after each rotation caused by the rolling cam 123, as a result of which the mandrel brake arrangement 114-117 described above is inactivated, the mandrel is indexed to the exact rest position and the holding finger is urged to the open position so that the front end of the material web 41 can be introduced.

DRIVER ELEMENT UNIT

The driver element 55 has the form of a sleeve 141 which can be shifted around the cylindrical part of the mandrel and which is connected to a vertically displaceable shaft 142 running parallel with the mandrel. The driver element 55 can be shifted between an upper position (fully drawn lines in FIG. 16) and a lower position (dash-dotted lines in FIG. 16), and the driver element is operated in that the upper end of the vertically displaceable shaft 142 is connected to a vertically extending part of a toothed belt 143, which toothed belt passes over guide pulleys 144, supported so that they can freely rotate in the upper part of the machine 37. The one end of the toothed belt 143 is connected to a lever arm unit 145, and the other end of the toothed belt 143 is connected to a return spring 146 (FIG. 18). The lever arm unit 145 is acted upon by a cam 147 (hereinafter called driver cam) arranged on the upper camshaft 32, which via the toothed belt 143 drives the driver element 55 in its vertical reciprocating movement.

The lever arm unit 145 makes it possible to shift the driver element 55 between a fixed upper turning point and a variable lower turning point. This is necessary, since packing containers of varying height can be manufactured in the machine by varying the width of the material web 41. When a shell blank 4 of greater height than normal is on the upper part of the mandrel and is to be shfted downwards to the position in which its bottom end extends beyond the lower end of the mandrel 43, the lower turning point of the driver element 55 has to be moved upwards so that the edge region of the shell blank 4 extending beyond the lower end of the mandrel 43 should not become excessively wide. This adjustment is achieved by means of the lever arm unit 145 which comprises a primary lever arm 148 and a secondary lever arm 149 and an intermediary lever arm 150 arranged between them, all of which are supported pivotably in a bracket 151. The bracket 151 carries two bearing shafts 152 and 153 to support the primary and the secondary lever arm 148 and 149 respectively. The bracket 151 carries moreover a vertically displaceable supporting block 154 which by means of a shaft 155 supports the intermediate lever arm 150. The two fixed bearing shafts 152 and 153 are at some distance from one another in vertical as well as in horizontal direction and the displaceable shaft 155 is displaceable along a vertical path, the lower end of which is directly above the bearing shaft 153 and the upper end of which is directly adjoining (on the left in FIG. 18) the bearing shaft 152.

When during the operation of the machine the upper camshaft 32 rotates, the driver cam 147 acts upon a roller 156 supported in the primary lever arm 148, as a result of which the primary lever arm receives a pivoting movement. This movement is transmitted to the secondary lever arm 149 via three rollers 158, 159 and 160 supported freely rotatably on a common shaft 157 at the lower end of the intermediate lever arm 150. The middle roller 159 is acted upon when the primary lever arm 148 is pivoted by a plane surface 161 on the primary lever arm, which surface is situated right opposite the roller 159. Subsequently the movement is transmitted via the shaft 157 and the two rollers 158 and 160 to two parallel vertical surfaces of the side of the secondary lever arm 149 facing the primary lever arm 148 and being situated right opposite the rollers 158 and 160. The movement of the secondary lever arm is then transmitted via a belt pulley 162 supported so that it can rotate freely in the lower end of the secondary lever arm to the belt 143 actuating the driver element 55. When the lower turning point of the driver element 55 is to be adjusted, e.g. lowered the supporting block 154 is shifted upwards. This means that the transmission element consisting of the shaft 157 and the rollers 158, 159 and 160 is moved closer to the supporting point of the secondary lever arm so that the transmission ratio between the primary lever arm and the secondary lever arm is altered. The secondary lever arm will now, in comparison with earlier on, perform a larger movement at a certain given movement of the primary lever arm, as a result of which the driver device 55 is given a greater length of stroke via the belt 143, so that its lower turning point is lowered.

The mutual geometric relationship between the bearing shafts 152 and 153 and the upper camshaft 32 is chosen so that the plane surfaces on the primary lever arm and secondary lever arm co-operating with the transmission element 157-160 are parallel with one another when the roller 156 of the primary lever arm 148 rests against the smallest radius of the driver cam 147, that is to say when the driver element 55 is in its upper turning position. In this position a shifting of the transmission element will thus not affect the secondary lever arm 149, and since the primary lever arm and the secondary lever arm return to be parallel with one another each time the roller 156 of the primary lever arm rests against the smallest radius of the cam 147, the upper turning position of the driver device is not affect by an adjustment of the transmission ratio between the lever arms.

HOT AIR NOZZLE

To facilitate the winding of the material sheet 4 around the mandrel and conversion of the same to a sleevelike shell blank the hot air nozzle 53 (FIGS. 20, 21 and 22) is arranged to heat the material sheet on its path between the cutting device 51 and the mandrel 43. The hot air nozzle 53 has a width substantially corresponding to the width of material sheet 1 and is connected via a flexible hose 171 to a source of hot air arranged in the machine. The hot air nozzle 53 is suspended displaceably in a fixed bracket 172, which is provided with a guiding groove 173 extending in the direction towards the point of contact between the material sheet 1 and the peripheral surface of the mandrel 43, in which pegs 174, present in the front end of the hot-air nozzle 53, are arranged to move when the front end of the hot-air nozzle 53 moves towards and away from the material sheet 1. This movement of the nozzle is produced by the nozzle 53 being suspended at its rear end in a forklike device 175, which is fitted to a rotatable shaft 176, which is connected via a link 177 to a lever arm 178. The lever arm 178 is supported pivotably at its upper end on a shaft 179 fixed in the frame of the upper part of the machine 37, and the lever arm 178 is adapted so that it is acted upon, via a roller 180 supported freely rotatably in the lever arm 178, by a cam 181 arranged on the upper camshaft 32. A return spring 182 ensures that the roller 180 accurately follows the contour of the cam 181.

The hot-air nozzle 53 is shown in FIG. 21 in its front position wherein the mouth of the nozzle is at an angle between the material sheet 1 and the cylindrical surface of the mandrel 43. In FIG. 22 the hot-air nozzle 53 is shown in its rear, inactive position, in which the hot-air jet from the continuously blowing nozzle is prevented from reaching the material sheet by means of a jet-reversing element 183 which can be pivoted into a position in front of the nozzle mouth. The jet-reversing element 183 is supported pivotably by means of a shaft 184 in the bracket 172 and a peg 185, arranged at the side of the hot-air nozzle 53 facing the jet-reversing element, actuates on the return movement of the nozzle an adjustment screw 186 placed at the rear end of the jet-reversing element 183, so that the jet-reversing element 183 is turned about the shaft 184 in clockwise direction with its front end pivoting in front of the mouth of the hot-air nozzle 53 and breaking the jet.

The hot-air nozzle 53 is operated between its active and its in-active position in rhythm with the rotation of the mandrel 43. When the holding finger 52 co-operating with the mandrel 43 in the standstill position of the mandrel embraces and retains the front end of the material sheet 1, the hot-air nozzle 53 is in its rear, inactive position. At the same time as the mandrel rotation is started, the hot-air nozzle is moved by the cam 181 to its front position and, during the whole rotation of the mandrel heats the passing material sheet directly before the same is wound around the cylindrical surface of the mandrel. When the material sheet has been almost fully wound around the mandrel, the rotation of the same is stopped, as mentioned earlier, for a short instant during which the two short ends of the material sheet are in the jet from the hot-air nozzle. As a result of this the ends are heated up to the softening temperature of the material so that they can be heat-sealed to each other to a longitudinal joint 5. After this intensive heating the nozzle is returned again to its rear position.

WEB FORMING UNIT

When the material sheet 1 after cutting from the material web 41 and heating means of the hot-air nozzle 53 is to be wound around the mandrel to form a shell blank 4, it is made to adhere accurately to the cylindrical surface of the mandrel 43 with the help of the web forming element 54 arranged adjacent to the mandrel, which will be described in greater detail with special reference to FIG. 23 and 24. The web forming device 54 is supported by a vertical shaft 187, which is supported so that it can rotate in the upper part of the machine 37 and is provided at its upper end with a lever arm 188 which via a link 189 is connected to one arm of a bell crank lever 190, which bell crank lever's other arm supports a roller 191 supported in a freely rotatable manner, which by means of a spring 192 acting on the bell crank lever 190 is made to rest against and accurately to follow the contour of a further cam 193 arranged on the upper camshaft 32, as a result of which the shaft 187 supporting the web forming device 54 during operation of the machine is made to turn in a reciprocating movement in rhythm with the rotation of the cam 193. The shaft 187 extends substantially parallel with the mandrel 43 and at its lower end there is a lever arm 194 fixed, so that it cannot rotate, to the shaft 187, which in vertical direction is situated right opposite the area of the mandrel 43 at which the shell blank is formed. The lever arm 194 is provided adjoining its outer end with a shaft 195 which is parallel with the mandrel 43 and serves for the pivotable supporting of a holder 196 which extends at a substantially right angle from the lever arm 194 in the direction towards the mandrel 43. The outer end of the holder 196 terminates opposite the mandrel 43 in a vertical shaft 197 which serves for the controllable support of a pressure device 198. The shaft 197 also carries a roller 199 which is urged by a leaf spring 200 fixed to the outer end of the lever arm 194. The spring 200 acts upon the holder 196 so that the same pivots about the shaft 195 to rest against an adjusting screw 202 arranged in a peg 201 on the lever arm 194. The pressure device 198 arranged at the outer end of the holder 196 consists of two mutually parallel plates 203, which are supported pivotably by means of the shaft 197 at the upper and lower side respectively of the holder 196. The plates 203 are substantially triangular and are connected to one another at the three corners, namely at the first corner by means of the said shaft 197, at the second corner by means of a longitudinal joint compression device 204, which is in fixed connection with the two plates 203 and is provided with a cambered compression surface 205, and at the third corner by means of a further vertical shaft 206 which serves for the supporting of a roller arranged parallel with the roller 199. The shaft 206 extends a little above the surface of the upper plate 202, and the projecting part serves as a pivotable bearing point for the one end of a link 208, the other end of which is connected rotatably with a vertical rod 209 which at its upper end is in fixed connection in the upper part of the machine 37. The web forming element 54 is pivotable via the shaft 187 between three positions determined by the cam 193, namely a first position in which the compression roller 207 as well as the compression device 204 are at a distance from the mandrel 43, a second position in which the leaf spring 200 urges the compression roller 207 to rest against the mandrel and a third position in which the compression roller 207 as well as the pressure surface 205 of the compression device 204 rest against the mandrel.

The operation of the web forming device 54 between the abovementioned three positions and the co-operation between the mandrel 43, the web forming device 54, the holding finger 52 and the hot-air nozzle 53 are described in the following with special reference to FIG. 25–31, which show step by step the co-operation of the said elements in the conversion of a material sheet 1 to a sleevelike shell blank 4 provided with a longitudinal joint 5.

In FIG. 25 are shown the co-operating devices at the instant when the front end of the material sheet 41 is advanced to the mandrel. The front end of the material web has not yet been clamped tight between the mandrel 43 and the holding finger 52 which is shown in its inactive position at a distance from the mandrel. The hot-air nozzle 53 is in its rear, inactive position. The web forming device 54 is in its pivoted-out, first position in which neither the compression roller 207 nor the compression surface of the pressure element 198 rest against the mandrel 43. The holder 196 of the web forming device 54 is pressed by the spring 200 to rest against the adjusting screw 202.

In FIG. 26 the front end of the material web has been gripped to the peripheral surface of the mandrel 43 by means of the holding finger 52 which has been moved to its active position. The hot-air nozzle 53 has also been moved to its front, active position and the heating of the material web has started. The mandrel rotation as well as the pivoting forwards of the web forming element 54 to the second position are about to be started.

As this moment the cutting device performs its working stroke as has been described in connection with FIG. 11–15, and the front part of the material sheet is cut off to form a material sheet 1, whose length somewhat exceeds the circumference of the mandrel 43.

In FIG. 27 the mandrel commences to rotate anti-clockwise, so that the cut-off material sheet which is heated continuously by the hot-air nozzle 53 situated in its working position commences to be wound around the mandrel. The web forming element 54 at the same time is pivoted clockwise to its second position in which the compression roller 207 acted upon by the spring 200 causes the material sheet to rest against the cylindrical surface of the mandrel 43 during the rotation of the mandrel.

In FIG. 28 the web forming element 54 is shown in its second position and the forming of the shell blank 4 continues during continuous heating by means of the hot-air nozzle 53.

In FIG. 29 the forming of the shell blank 4 has been virtually completed and the mandrel rotation has been stopped in such a position that the two ends of the sheet wound around the mandrel are directly exposed to the hot air from the nozzle 53. The nozzle as well as the holding finger are in their active positions and the web forming element 54 continues to be in its second position.

In FIG. 30 the hot-air nozzle has been returned to its withdrawn, inactive position and the web forming element 54, by virtue of a further pivoting in clockwise direction of the shaft 187, has been moved to its third position, in which the pressure device 198 by means of the link 208 is turned clockwise so that the pressure surface 205 is pressed strongly against the end parts of the material sheet heated up to softening temperature, which are pressed together to form a longitudinal joint.

In FIG. 31 is shown the web forming element 54 during the return movement to the starting position at the same time as the mandrel 43 is rotated to the rest position. The hot-air nozzle 53 continues in its inactive position and the holding finger 52 will, when the mandrel has reached its rest position, release the sleeve-shaped shell blank 4, which thereafter, as described earlier, is pushed downwards to the bottom end of the mandrel 43 to make room for the subsequent material sheet 1 and a repeat of the forming cycle described.

LOWER MACHINE SECTION

DEVICES FOR THE FEED OF THE BASE AND THE CUTTING OF THE BASE

The base blanks 6 are supplied to the machine as mentioned previously in the form of a continuous band 45 of octagonal base blanks 6. The band runs from a magazine roll 44 supported rotatably in the roll stand 39 via guide pulleys and control devices, not shown on the drawing to the base feed wheel 76 which is situated in the vicinity of the bottom end of mandrel 43 and is supported by a horizontal shaft 210 supported in a freely rotatable manner in the lower machine section 38. The base feed wheel 76 is hexagonal and comprises six place surfaces 211 which are substantially square and have a size which substantially agrees with the size of each base blank 6. At the edges which separate the plane surfaces 211 from each other the base feed wheel 76 is provided with drivers 212 which have the form of knife edges extending parallel with the shaft 210. Each driver 212 is provided at its central part with a cutout 213, the width of which somewhat exceeds the width of the parts of the band 45 at which the base blanks hang together.

During operation of the machine the base feed wheel is rotated step by step in the direction of the arrow 214 and the band 45 is driven substantially one half turn around the periphery of the wheel so that it is fed into the cutting element 56 at the upper part of the wheel. The band guided along this track by means of a guiding channel 215 arranged before the base feed wheel 76 wherein the band 45 is retained by means of a brake spring 216, which moreover ensures that the band is kept plane and straight. The band 45 is guided around the base feed wheel 76 in engagement with the drivers 212 by means of a flexible band 217, the one end of which is fixed in the machine frame above the base feed wheel 76. From this fixed point the band runs around approximately one-third of the periphery of the wheel and is fixed at its other end in the machine frame by means of a spring 218. At the upper part of the base feed wheel 76 the band 45 leaves the base feed wheel and runs out on a stationary plane surface 219, at the end of which is arranged the cutting element 56. The cutting element 56 comprises a stationary knife 220 and a vertically movable knife 221 co-operating with the same. At a distance from the cutting element, which corresponds to the length of one base blank 6, there is an elastic stop 222. Between the cutting element 56 and the stop 222 is arranged the base transfer device 57. The base transfer device, which is also shown in FIG. 33 and 34, comprises a pivotable lever arm 223 which at its one end is in fixed connection with a horizontal shaft 224 supported rotatably in the machine frame. At its other end the lever arm 223 carries a suction head 225 which on pivoting of the lever arm 223 around the shaft 224 is movable between a first position (FIG. 32) between the cutting element 56 and the elastic stop 222 and a second position (FIG. 34) in contact with the bottom surface of the mandrel 43.

Each time the base feed wheel 76 is rotated 1/6th turn in the direction of the arrow 214, the band 45 will be fed forwards a distance which corresponds to the length of a base blank 6 and the front end of the band 45 will come into contact with the stop 222. Since the distance between the stop 222 and the cutting element 56 corresponds to the length of one base blank 6, the co-operating knives 220 and 221 will on activation sever the base blank situated in this position from the remainder of the band 45. During the feed of the band towards the stop 222 and the severing of the front base blank the base transfer lever arm 223 is positioned as shown in FIG. 32 and after the severing of the front base blank 6 the detached base blank is retained by the suction head 225 on the lever arm 223, which by pivoting about the shaft 224 transfers the base blank to rest against the end of the mandrel 43.

The driving of the base feed wheel 76 as well as of the cutting element 56 and the base transfer element 57 is illustrated in FIG. 33. The base feed element 76 and the cutting element 56 are driven by a common cam 226 arranged on the lower camshaft 29. The contour of the cam 226 is scanned by means of a lever 227 supported pivotably in the frame of the lower machine section 38, the one end of which is held by means of a spring 228 in contact with the cam. The other end of the lever 227 is connected via a link rod 229 to the one arm of a lever 230 supported in a pivotable manner. Between the junction of the link rod 229 with the lever 230 and the supporting shaft 231 of the lever, the lever is provided with a laterally projecting freely rotatable roller 232. At the outer end of the other arm of the lever 233 there is a corresponding roller 233. The lever 230 is connected via this roller 233 to a lever arm 234 which is firmly connected to the shaft 210 of the base feed wheel 76 and more particularly the roller 233 is adapted so that it runs in a track arranged in longitudinal direction of the lever arm 234. At the other end of the shaft 210 the base feed wheel 76 is supported via a combined one-way and locking coupling, which when the shaft 210 is driven in a reciprocating movement ensures that the feed wheel is moved step-by-step 1/6th turn in anticlockwise direction.

In the direct vicinity of the lever 230 there is a further lever 235 whose end, remote from the lever 230, is arranged so that it is acted upon by the roller 232. The said lever end is connected via a link 236 to the movable knife 221, which via the link rod 236 is retained by means of a spring 237 acting upon the lever 235 in a lower, inactive position.

On rotation of the lower camshaft 29 of the manufacturing machine the cam 226 will impart to the lever 230 a pivoting movement between the position which is illustrated in FIG. 33 and a position in which the lever has been turned approx. 1/5th of a turn in clockwise direction. When the lever is turned from the position shown, the roller 233 situated at the upper end of the lever 230 will act upon the lever 234 so that the shaft 210 is pivoted in anticlockwise direction. As a result the shaft 210 advances the base feed wheel 76 one step. When the lever 230 commences to approach the end of its turn in clockwise direction, the roller 232 supported on the lever will come into contact with the one end of the lever 235 and lift the same against the effect of the spring 237. The lifting movement is transmitted via the link 236 to the lower knife 221 of the cutting element 56, which in co-operation with the fixed knife 220 in a scissorlike manner severs the newly advanced base blank situated at the front end of the band 45. During the return stroke in anticlockwise direction of the lever 230 which follows, the knife 221 is returned to its lower inactive position by the spring 237. At the same time the roller 233 returns the lever arm 234 to the position shown in FIG. 33, which, because of the one-way coupling arranged between the feedwheel and the shaft 210, does not affect the base feed wheel.

The operation of the lever arm 223 of the base transfer device 57 takes place by means of a further cam 281 arranged on the lower camshaft 29. The periphery of the cam 281 acts upon a roller 282 which is supported in a freely rotatable manner at the one end of a lever 283. The lever 283 is pivotably supported in the frame of the lower machine section 38 and its other end is connected via a toothed belt 284 to a spiral spring which acts upon the roller 282 to make it rest against the peripheral surface of the cam 281. The toothed belt 284 runs over a belt pulley 285 which is in fixed connection with the shaft 224 which carries the lever arm 223 of the base transfer device 57. When the cam 281 rotates the belt 284 will be given a reciprocating movement, which via the belt pulley 285 and the shaft 224 imparts a pivoting movement to the lever 223. The movement of the lever arm 223 is so synchronized with the base feed and severing that the feed as well as the severing always take place with the lever arm 223 in the position shown in FIG. 32.

SHRINKING AND BASE FORMING UNIT

The movable shrinking and base forming unit 79 and the arrangement for movement of the same between different working positions will now be described in more detail with special reference to FIG. 35-39. As mentioned earlier, the shrinking oven 58, the base forming or base assembling device 59 and the gripping element 60 are combined to a unit 79 which is movable in horizontal as well as in vertical direction. The unit is located underneath the mandrel 43 and has three working duties, namely in the first place to heat the shell blank and the base blank located at the bottom end of the mandrel, secondly immediately after the heating to press together the folded-in edge of the shell blank with the base blank and form the base of the container, and thirdly after the forming to transfer the container from the bottom end of the mandrel 43 to the intermittently operating conveyor chain 25 arranged adjoining to the mandrel. To make is possible for the unit 79 to carry out these duties it has to be displaceable in horizontal direction so that each of the elements included in the unit can be brought into line with the mandrel. Furthermore it must be possible to move the shrinking over 58 as well as the assembling device 59 when they have been brought in line with the mandrel vertically upwards to a working position. This operation is made possible in that the shrinking oven 58 and the base assembling device 59 can be moved independently of each other in vertical direction and in that the operation of the unit in vertical direction and horizontal direction takes place by means of two separate cams 238 and 239, each of which is arranged on the lower camshaft 29.

It is evident from FIG. 36 that the shrinking oven 58 comprises a tubular upper part 240 provided with an air heating unit, which via a concentrically connected tube 241 is attached to a supply line 242 for air. Directly below the tubular part 240 the tube 241 is provided with two freely rotatable rollers 243 arranged opposite one another. Between the lower end of the tubular part 240 and a bracket 244 fixed at the bottom end of the tube 241 and projecting laterally, extends a guide 245 which is parallel with the tube 241 and is situated at some distance from the same. At the central part of the tubular part 240 there is a third bracket 247 which carries two fingers 248 and 249 pivotably in horizontal direction which form the gripping element 60 described earlier.

Parallel with the shrinking oven 58 there is the base assembling device 59 which consists of a vertical shaft 250 at the upper end of which there is an adjustable disc 251. The lower end of the shaft 250 is connected to an attachment 252 which like the shrinking oven 58 is provided with two freely rotatable rollers 253. The attachment 252 comprises an arm 254 extending towards the shrinking oven which at its outer end is supported in a vertically displaceable manner on the guide 245. At its upper end the shaft 250 of the base assembling device 59 is likewise vertically displaceably supported in the bracket 246.

The unit consisting of the shrinking oven 58, the base assembling device 59 and the gripping element 60 is supported by a bell crank lever 255 which is supported pivotably on the shaft 256 arranged in the lower machine section 38. The one arm of the bell crank lever 255 is fork-like and the arms are provided on their surfaces facing one another with two longitudinal tracks 257 located opposite one another and extending substantially horizontally, in which the roller pairs 243 and 253 of the unit 79 are arranged to run. The tracks 257 end at the outer end of the lever arm, and at the opposite end the tracks 257 are connected to the vertical track 258 ending below the lever arm. The other arm of the bell crank lever 255 is provided at its outer end with a roller 259 which by means of a spring is urged to rest against the cam 239. On rotation of the lower camshaft 29 the unit 79 will be raised and lowered by means of the bell crank lever 255 in rhythm with the shape of the cam 239. The unit 79 is not worked upon in horizontal direction by this movement, but the two roller pairs 243 and 253 can freely move along the track 257.

The controlled displacement of the unit in horizontal direction takes place by means of a travelling crab 260 (FIG. 35) which is supported so that it is horizontally movable on a horizontal guide 261 supported by the lower machine section 38. The crab 260 is connected controllably at its end facing the lower camshaft 29 to one arm of a lever 262. This lever arm carries a freely rotatable roller 263 which by means of a spring 264 acting upon the other arm of the lever is urged to rest against a cam 238 arranged on the lower camshaft. The crab 260 will thus perform a horizontal reciprocating movement in rhythm with the rotation of the lower camshaft 29. The crab 260 in turn acts upon the unit 79 consisting of the shrinking over 58, the base assembling device 59 and the gripping element 60 so that the same slides along the track 257 in the bell crank lever 255 in rhythm with the movement of the crab 260. This effect is achieved owing to the tube 241 connected to the shrinking over 58 and the shaft 245, and the base assembling device 59 being supported in a vertically displaceable manner in a part of the crab 260 extending underneath the horizontal arm of the bell crank lever 255. The movement of the crab 260 in horizontal direction is thus transmitted directly to the unit, whilst the crab is not able to affect the elements included in the unit in vertical direction.

The movement scheme of the unit consisting of shrinking oven 58, the base assembling device 59 and the gripping element 60 during the operation of the machine will now be described in detail with special reference to FIG. 36-39, which illustrate step by step the different positions of the unit. In FIG. 36 the horizontal arm of the bell crank lever 255 is in a lower position in which the shrinking oven 58 as well as the base assembling device 59 and the gripping element 60 are at some underneath the lower end of the mandrel 43. In horizontal direction the unit is in its centre position, that is to say the position in which the shrinking oven 58 is in the prolongation of the centre line of the mandrel 43. In this indexing position the shrinking oven 58 is supported thanks to the engagement of the roller pair 243 in the track 257 of the bell crank lever whilst the roller pair 253 of the base assembling device 258 is just at the vertical part of the track 258 in the bell crank lever and thus cannot support the base assembling device, which instead is supported thanks to the resting of the attachment 252 against the horizontal part of the crab 260. In the gripping device 60 located at the upper part of the shrinking oven 58 is a container 265 completed during the immediately preceding working cycle, whilst the mandrel 43 carries at its bottom end a sleeve-like shell blank 4 and a base blank 6, which are converted to a container during the working cycle which will be described.

In FIG. 37, owing to the rotation of the cam 239, the bell crank lever 255 has been pivoted to an upper position. In horizontal direction the unit continues to be in the position shown in FIG. 36, which implies that the pivoting of the bell crank lever has raised the shrinking oven 58 to a working position wherein the upper part of the same surrounds the bottom part of the shell blank 4 located on the mandrel 43, as a result of which the hot air flowing through the shrinking oven 58 heats and shrinks the shell blank 4 as well as the base blank 6. The base assembling device 56, owing to its roller pair 253 being on the same level as the vertical track part 258, is not acted upon by the turning of the bell crank lever but continues to be in the position shown in FIG. 36 with the attachment 252 resting against the upper surface of the horizontal part of the crab 260. After a predetermined time required for the heating of the shell blank 4 and the base blank 6 the bell crank lever is pivoted anticlockwise so that the groove 257 will be in horizontal position and the shrinking oven 58 is lowered into the position shown in FIG. 36.

Owing to the returning of the bell crank level 255 to the position shown in FIG. 36 the open end of the track 257 comes to the situated opposite a bracket 266 supported by the frame of the lower machine section 38, in which is provided a corresponding horizontal track 267. During the time the track 257 is opposite the track 267 an indexing of the unit takes place one step to the left in the figure, which means that the roller pair 243 of the shrinking oven 58 rolls over into the fixed track 267 at the same time as the base assembling device 59 is moved to a position which is axially underneath the mandrel 43. Furthermore, by virtue of the indexing of the unit, the gripping element 60 will be introduced into the transport chain 25 and will deliver there the complete container 265. After the indexing of the unit, the bell crank lever 255 is pivoted again in clockwise direction to an intermediate position or base attaching position, which through the engagement of the roller pair 253 in the track 257 lifts the base assembling device 59 so that the disc 251 arranged at the top end of the same will make contact with and press the base blank 6 together with the folded-in lower edge zone of the shell blank 4 (FIG. 38). After the assembling and forming of the container located on the mandrel 43 has been completed and the container formed previously has been transferred to the transport chain 25, the bell crank lever is pivoted anticlockwise to the lower position shown in FIG. 39.

When the track 257 of the bell crank lever reaches the horizontal position right opposite the track 267 arranged in the bracket 266, an indexing of the unit consisting of the shrinking oven 58, base assembling device 59 and gripping element 60 to the right in the figure takes place to the position wherein the gripping element 60 is axially in line with the mandrel 43. When the unit has reached this position, the driver element 55 is moved down-wards and displaces the next shell blank 4", formed during the working cycle described, down-wards along the mandrel. The lower edge of the shell blank 4" will hereby come to rest against the upper edge of the completed container and the completed container will be pushed downwards into the gripping element 60 and retained between the spring-loaded fingers 248, 249 of the same. Then the unit is indexed again into the position shown in FIG. 36 for heating of the following shell blank, whereupon the cycle is repeated.

FIG. 40 shows the transfer of a completely formed packing container from the gripping element 60 mounted on the shrinking over 58 to the transport chain 25 which moves intermittently in the direction of the arrow 268 and transfers the packing containers to the filling machine 13. The transport chain 25 comprises a chain 269, which is guided and supported in a channel 170. The chain 269 carries at its lower end controllably arranged U-shaped holders 271 which are turned with their open side in the direction towards the gripping element 60 supported by the shrinking oven 58.

The gripping element 60 comprises, as mentioned earlier, two fingers 248, 249, which are supported so that they can each pivot horizontally about a vertically shaft 272. The fingers 248, 249 are arranged to be actuated between a closed position, wherein the fingers embrace and retain a packing container between themselves, and an open positon, wherein the fingers are separated from one another. These two finger positions are determined by a protrusion 273, arranged at the rear part of the fingers and projecting sideways, which cooperates with the springs 274 and fixes the fingers in either of the two positions.

The change-over of the fingers 248, 249 from the closed to the open position and vice versa occurs as the gripping element 60 is introduced to and withdrawn from the transport chain 25 respectively, and is controlled by means of two vertical pins 275, 276, which are in stationary arrangement at a slight distance from the transport chain 25 and at mutual distance which somewhat exceeds the width of the gripping element 60. When the gripping element 60 together with a completely formed container held by the gripping element is moved into the transport chain 25 through indexing of the unit, the lower end of the two pins 275, 276 will act upon the stop 277 projecting at the rear end of the fingers 248, 249 at a substantially right angle from the fingers, as a result of which the fingers are manoeuvered to the open position in which they are retained owing to the co-operation of the protrusion 273 with the springs 274. The completely formed container has now been transferred to and is carried by the holder 271 of the transport chain 25.

When the gripping element 60 is withdrawn from the transport chain, that is to say moved to the right in FIG. 40, the pins 275, 276 will no longer act upon the stop 277 of the arms. The arms remain, however, in the open position, retained by the protrusion 273 and the springs 274 until the fingers 248, 249 have been virtually withdrawn from the transport chain 25. At the end of the return of the gripping element 60 shoulders 278 located at the outer end of the fingers 248, 249 are arranged to be acted on by the pins 275, 276, as a result of which the fingers, against the effect of the springs 274, are returned to the closed position and the gripping element 60 is ready to receive the next completely formed container.

FILLING MACHINE SECTION

The transport chain 25 now transfers the completely formed containers to the filling machine 13 and the containers are transferred from a part of the transport chain 25 moving transversely across the conveyor 15 of the filling machine by means of elements provided with suction heads to the cutout 16 in one of the transverse segments of the conveyor 15. When the segment has been filled with packing containers open at the top, the conveyor 15 is indexed one step so that the next, not yet filled, segment is placed underneath the transport chain 25. After a number of indexings, the firstmentioned segment, filled with packing containers has reached the filling unit 46 (FIG. 2) arranged above the filling machine, which comprises a container 279 for the material to be filled and a number of filling pipes 280 running vertically downwards from the same and being provided with shutoff valves. The number of filling pipes 280 corresponds to the number of cutouts 16 arranged transversely across the conveyor 15 which are present on each conveyor segment. With the help of control devices, wellknown to anybody versed in the art, the valves of the filling pipes 280 are then opened for such a time that the packing containers placed in the conveyor 15 are filled with contents to the desired level.

By means of further indexings of the conveyor 15 the filled row of packing containers then reaches the lid unit 47, which like the filling unit 46 is arranged above the upper part of the conveyor 15. The lid unit 47 now punches out a number of lids 9 from the material web running between the lid material roll 48 and the return material roll 36, whose width substantially coincides with the width of the conveyor 15. The punched-out lids 9 are heated and thermoformed subsequently so that they obtain the desired shape with a substantially plane central area 10 and a flange 11 surrounding this area. By heating of the upper edge area of the packing container and the flange 11 of the lid 9 to the softening temperature of the material and subsequent application of the lids 9 to the packing containers each lid is then joined to a packing container in an impervious seal.

By means of a number of further indexings of the conveyor 15 the filled and closed packing containers then reach a station at which they are withdrawn from the cutouts 16 of the conveyor 15 to be further transported via the chute 49 to the required place, for example for packing in larger collective containers.

The machine in accordance with the invention comprises beside the above-mentioned devices and details also a large number of conventional elements, e.g. brackets, attachment elements, pneumatic valves and others which are however of a wellknown type and do not require any more detailed description. The toothed belts which are used for the driving of the different elements can be substituted, of course, by other power-transmitting elements, e.g. chains or any other element which within the scope of the following claims can be substituted for other equivalent elements.

In the lower machine section 38 fans and heating units for the generation of the hot air used in the hot-air nozzle 53 and the shrinking oven 58 are also indicated on the left in FIG. 2. Above the lower camshaft 29 the programming mechanism 33 is further arranged which via a number of cams arranged on the camshaft 34 in conventional manner acts upon micro-switches. The micro-switches are used for the controlling of certain functions in the machine e.g. the keeping to pattern during the feed of the material web 41 and the vacuum and pressure in the mandrel ducts 165 and 166.

Finally it should be emphasized that the described forming process is continuously repeated and that the immediately proceding or following forming processes partly overlap and take place at the same time as the forming process described. Thus, for example, the shrinking of a packing container located at the bottom end of the mandrel takes place at the same time at the mandrel rotation and the forming of the subsequent shell blank, and likewise the transfer of a completed container to the transport chain 25 takes place simultaneously with the base formation of the subsequent container.

We claim:

1. A machine for the manufacture of cup-shaped packing containers of a heat-shrinkable thermoplastic web material comprising, a mandrel rotatable about its axis and having an upper cylindrical portion and a lower frusto-conical portion, means for intermittently rotating said mandrel, means for intermittently feeding a continuous web of the material to the upper cylindrical portion of said mandrel, means for clamping the leading edge of said web to the outer circumference of said mandrel, means for cutting said web into blanks when the leading edge of the web is clamped to the mandrel so that when said mandrel is rotated a blank is wrapped about the cylindrical portion thereof to form a sleeve-shaped shell having overlapping opposed edges, means for heat sealing the overlapping opposed edges of the blank together, means for releasing said clamping means when the shell has been formed, means for displacing the shell downwardly of said mandrel so that the lower edge portion of the shell extends below the frusto-conical portion of said mandrel, means for introducing a base blank into the lower open end of the shell against the bottom of the mandrel, means for heating the lower end of the shell and base blank to cause the end of the shell to shrink inwardly of the shell to form an inwardly extending flange embracing the circumference of the base blank and for sealing the flange and base blank together to provide an impervious bottom for the packing container, means for removing the container from said mandrel and means for filling and sealing the containers.

2. A machine as claimed in claim 1 wherein said means for intermittently feeding the web to said mandrel includes intermittently rotatable means for engaging one side of the marginal edge of the web, opposed rotatable counterhold means for engaging the opposite side of the marginal edge of the web to hold the web, and means for intermittently and rotatably actuating and releasing said edge engaging means and said opposed counterhold means in mutually opposite directions to engage and release the edge of the web.

3. A machine as claimed in claim 1 wherein said means for cutting the web into blanks comprises a reciprocally movable cutter holder disposed on one side of the web, a pressure plate resiliently mounted on said cutter holder, a counter-pressure plate disposed on the opposed side of the web for cooperation with said resiliently mounted pressure plate to hold the web during cutting, cutter means mounted on said cutter holder and means for reciprocably moving said cutter holder toward the web so that the resiliently mounted pressure plate will first engage the web and hold it against the counter-pressure plate and then moved the cutter means to cut the web.

4. A machine as claimed in claim 1 and further comprising roller means for pressing the blank against the cylindrical portion of said mandrel while said blank is being wrapped thereabout and pressure means for pressing together the overlapping opposed edges of the blank when the edges are heat-sealed together.

5. A machine as claimed in claim 4, and further comprising means for sequentially (1) pressing only said roller means against the blank while it is being wrapped about said mandrel to form the shell, (2) pressing said roller means and said pressure means against the shell during heat sealing of the overlapping opposed edges, and (3) withdrawing said roller means and said pressure means from the shell on the mandrel 6. A machine as claimed in claim 1 wherein the means for intermittently rotating said mandrel includes cam means and means responsive to said cam means for rotating said mandrel through substantially 360°.

7. A machine as claimed in claim 6 and further comprising means associated with said mandrel for indexing said mandrel to an exact initial position of rest following its rotation through substantially 360° when said clamping means is released by said releasing means.

8. A machine as claimed in claim 7 and further comprising braking means operative during rotation of said mandrel and means for releasing said braking means when said indexing means is operative for indexing said mandrel.

9. A machine as claimed in claim 1 and further comprising a second cutter means, means for intermittently feeding a strip of interconnected base blanks to said second cutter means for separating the leading base blank from said strip, said means for introducing a base blank into the lower open end of the shell including means for intermittently transferring each separated base blank from said second cutting means into the lower open end of the shell and against the bottom of the mandrel.

10. A machine as claimed in claim 9 wherein said strip feeding means includes a step-by-step rotatable feed wheel, rotatable cam means, and a linkage means for imparting step-by-step rotation to said feed wheel by said rotatable cam means.

11. A machine as claimed in claim 10 wherein said linkage means includes a lever for imparting a single step of the step-by-step rotation to said rotatable feed wheel and thereafter for actuating said second cutting means for separating the leading base blank from said strip.

* * * * *